US009301301B2

(12) United States Patent
Aumann et al.

(10) Patent No.: US 9,301,301 B2
(45) Date of Patent: Mar. 29, 2016

(54) DYNAMIC FREQUENCY REFARMING

(75) Inventors: Ottmar Aumann, Munich (DE); Jian Feng Qiang, Beijing (CN)

(73) Assignee: Nokia Solutions and Network Oy, Espoo (FI)

( * ) Notice: Subject to any disclaimer, the term of this patent is extended or adjusted under 35 U.S.C. 154(b) by 427 days.

(21) Appl. No.: 13/643,599

(22) PCT Filed: Apr. 26, 2010

(86) PCT No.: PCT/CN2010/000570
§ 371 (c)(1),
(2), (4) Date: Nov. 19, 2012

(87) PCT Pub. No.: WO2011/134099
PCT Pub. Date: Mar. 11, 2011

(65) Prior Publication Data
US 2013/0079009 A1  Mar. 28, 2013

(51) Int. Cl.
H04W 72/04 (2009.01)
H04W 16/02 (2009.01)
H04W 36/30 (2009.01)
H04W 72/08 (2009.01)
H04W 72/10 (2009.01)
H04W 16/14 (2009.01)

(52) U.S. Cl.
CPC .......... *H04W 72/0453* (2013.01); *H04W 16/02* (2013.01); *H04W 36/30* (2013.01); *H04W 72/085* (2013.01); *H04W 72/10* (2013.01); *H04W 16/14* (2013.01)

(58) Field of Classification Search
CPC combination set(s) only.
See application file for complete search history.

(56) References Cited

U.S. PATENT DOCUMENTS 7,224,977 B2 * 5/2007 Cavalli ............. H04W 36/0083
370/329
8,169,953 B2 * 5/2012 Damnjanovic ....... H04B 7/2615
370/329
8,189,523 B2 * 5/2012 Barbaresi ............. H04W 28/16
370/230

(Continued)

FOREIGN PATENT DOCUMENTS

| CN | 101635928 A | 1/2010 | |
|---|---|---|---|
| IT | EP 1418782 | * 12/2004 | ............... H04Q 7/38 |
| WO | WO 2008081309 A2 | 7/2008 | |
| WO | WO 2008088254 A1 | 7/2008 | |
| WO | WO 2011/023073 A1 | 3/2011 | |

OTHER PUBLICATIONS

3GPP TS 36.331 V8.3.0 (Sep. 2008), "3rd Generation Partnership Project; Technical Specification Group Radio Access Network; Evolved Universal Terrestrial Radio Access (E-UTRA) Radio Resource Control (RRC); Protocol specification (Release 8)", 178 pgs.

(Continued)

*Primary Examiner* — Christopher M Brandt
*Assistant Examiner* — Martin Chang
(74) *Attorney, Agent, or Firm* — Harrington & Smith

(57) ABSTRACT

A Network entity of a communication network and a network node are disclosed. The network entity includes a control unit, wherein the control unit is configured for receiving network status information and providing a refarming control signal to a network node on the basis of the network status information. The refarming control signal is related to a reuse of a frequency resource of a first communication technology by a second communication technology. For evaluation of frequency refarming, a concept of a figure of merit is disclosed which allows for an easy employment of a frequency refarming policy.

13 Claims, 4 Drawing Sheets

(56) References Cited

U.S. PATENT DOCUMENTS

| | | | | |
|---|---|---|---|---|
| 8,355,735 | B2* | 1/2013 | De Pasquale | H04W 16/14 370/342 |
| 2004/0120286 | A1* | 6/2004 | Schwarz | H04W 36/22 370/331 |
| 2008/0242308 | A1* | 10/2008 | Gunnarsson | H04W 72/0486 455/450 |
| 2011/0244874 | A1* | 10/2011 | Fodor | H04W 48/18 455/450 |

OTHER PUBLICATIONS

"WCDMA Frequency Refarming", © Nokia Siemens Networks, Aug. 11, 2007, 9 pgs.

Chunlin, Li, "Get Ready for 900MHz Refarming", Huawei Communicate, Feb. 2010, Issue 54, 3 pgs.

Amir Ghasemi et al: "Spectrum Sensing in Cognitive Radio Networks: Requirements, Challenges and Design Trade-offs"; p. 32-p. 39; IEEE Communications Magazine, Apr. 2008, ISSN: 0163-6804.

* cited by examiner

DYNAMIC FREQUENCY REFARMING

FIELD OF THE INVENTION

The present invention relates to the field of frequency refarming, i.e. to the use of a frequency resource by different communication technologies.

ART BACKGROUND

Frequency refarming generally relates to the use of frequency resources of a certain communication technology by another communication technology period, for example in an article "WCDMA frequency refarming", available at unite.nokiasiemensnetworks.com/adwords/article/view/id/179 on the World Wide Web, GSM frequency refarming to WCDMA is reported (GSM=global system for mobile communication, WCDMA=wide band code division multiple access, see 3GPP=third generation partnership project). In this case, frequency resources of the GSM 900 MHz range have been statically assigned to a WCDMA carrier. It is reported that deploying WCDMA in the 900 MHz bandwidth currently used for GSM requires a careful frequency planning.

In view of the above described situation, there exists a need for an improved technique that enables refarming of frequency resources from a first communication technology to a second communication technology, while substantially avoiding or at least reducing one or more of the above identified problems.

SUMMARY OF THE INVENTION

This need may be met by the subject-matter according to the independent claims. Advantageous embodiments of the herein disclosed subject-matter are described by the dependent claims.

According to a first aspect of the herein disclosed subject-matter, there is provided a network entity for communication network, the network entity comprising a control unit, wherein the control unit is configured for receiving network status information. The control unit is further configured for providing a refarming control signal to a network node on the basis of the network status information, wherein the refarming control signal is related to a reuse of a frequency resource of a first communication technology by a second communication technology, wherein the first communication technology and the second communication technology are different.

This aspect of the invention is based on the idea that a dynamic reuse of a frequency resource of a first communication technology depending on network status information requires less effort in frequency planning and network optimization, because the refarming of a frequency resource of a first communication technology to a second communication technology is automatically performed depending on the status of the communication networks.

An operator of a cellular communication network may have multiple carriers/bands working in parallel. For example, more HSPA carriers/bands (HSPA=high speed packet access) may be available to increase capacity as HSPA (or LTE=long term evolution) gains popularity in the future. An operator may decide to refarm existing GSM carriers to HSPA ones. Frequency refarming can be attractive for cellular operators, i.e., operators may phase out GSM and smoothly establish HSPA Frequency refarming may occur between GSM, UMTS, LTE, Wimax, WiFi, or TV band etc, just to name some examples. Further, LTE may be implemented to use a digital dividend band (or TV white space <800 MHz) which can result in LTE with same coverage as GSM being co-located at the GSM sites. Cell planning complexity and site cost may be reduced if LTE is refarmed in the digital dividend band.

While the aforementioned examples refer to cellular communication systems, it should be emphasized that the herein disclosed subject matter is not limited to cellular systems or to wireless systems. Rather a large variety of wireless and wired communication systems may benefit from the herein disclosed subject matter, in particular, if a former communication technology is replaces by a newer communication technology. Such a case is embraced by an general embodiment, where the first communication technology and the second communication technology are different. In another embodiment, the first communication technology and the second communication technology are the same but employed by different network access nodes, e.g., in the case of a wireless communication system, different base stations.

According to an embodiment of the first aspect, the network status information relates to one of the first communication technology and the second communication technology. According to other embodiments, the network status information relates to both, the first communication technology and the second communication technology.

According to an embodiment, the control unit of the network entity is configured for providing the refarming control signal in response to the network status information, e.g. in another embodiment, in response to receiving the network status information.

According to an embodiment, in a centralized approach, the network entity provides the refarming control signal to at least one network node, usually a plurality of network nodes, in order to centrally control the use of a frequency resource of the first communication technology by one or more of the network nodes.

According to a further embodiment, in a distributed approach, the network entity provides to at least one network node a refarming control signal so as to enable the network node to decide on the use of a frequency resource of the first communication technology.

It should be noted that embodiments of the central approach are also applicable in the distributed approach and vice versa.

According to a further embodiment, the refarming control signal includes a trigger signal for triggering the reuse of the frequency resource of the first communication technology by the second communication technology. According to other embodiments, triggering of the reuse of the frequency resource is not performed by the network entity or its control unit, but rather by the network node which receives a refarming control signal.

According to an embodiment, the network status information is received by the network entity from network nodes, e.g. network access nodes, such as base stations. According to another embodiment, the network status information is received by the network entity from an operation, administration and maintenance part (OAM) of the communication network. According to an embodiment, the network status information characterizes the current network status.

According to an embodiment, the network status information, which is received by the control unit of the network entity, is configured for adjusting refarming policy information stored in the network entity. To this end, the network entity may comprise a storage for storing the refarming policy information. According to an embodiment, the network status information includes at least one refarming policy message which contains refarming policy information to be employed by the control unit of the network entity. According to an embodiment, the network status information is provided by one or more network nodes, e.g. one or more network access nodes such as base stations. It should be noted that herein the term base station is used in the broad sense of its meaning and not with regard to a specific standard. Hence the term base station embraces a base station of a GSM network, an nodeB or an e-nodeB, etc., just to name some examples of common standards.

According to an embodiment, the network entity is an operating policy server (OPS) which by means of the refarming control signal imposes a refarming policy on the network part controlled by the OPS on the basis of the received network status information.

According to an embodiment, the refarming control signal provides to the network node a refarming policy defining information, e.g. at least one input parameter, a threshold, a guideline (refarming policy information), etc., which defines the refarming policy for procedures which are locally evaluated in the network nodes and in negotiations between network nodes.

According to another further embodiment, the network entity may be a refarming neighborhood information server (RNIS), containing a network status information, e.g. in the form of refarming neighborhood information. According to an embodiment, the refarming neighborhood information includes relationships/information on the neighborhood of network nodes which are associated with the RNIS. In this sense, an RNIS is responsible for a predetermined geographical area including the associated nodes.

In one embodiment, the RNIS provides the refarming neighborhood information to an OPS which uses the refarming neighborhood information to select one or more network nodes for a certain frequency refarming step. The selected network nodes for a certain refarming step include, for example, the current holder or holders of a frequency resource and the new holder or holders, to which the frequency resource will be granted by the refarming step.

According to a further embodiment, the RNIS has a storage for storing refarming neighborhood information for a certain geographical area. According to a further embodiment, the control unit of the RNIS is configured for connecting to neighboring RNIS, which are responsible for neighboring geographical areas. In this way, refarming neighborhood information can directly be exchanged between neighboring RNIS. According to a further embodiment, a network entity in the form of an RNIS may be configured to act as mediating node between the base stations of the respective geographical area and the OPS responsible for this geographical area. For example, according to an embodiment, the control unit of the RNIS is configured for routing refarming policy information from the OPS to the network access nodes (e.g. base stations). According to a further embodiment, the control unit of a network entity in the form of an RNIS is configured for routing refarming policy messages from the network access nodes to the OPS.

According to an embodiment, the network entity performs some kind of pre-processing on the received network status information, e.g. refarming neighborhood information. In one embodiment, the received network status information includes a control signal which has been issued by the sending entity, e.g an OPS, as refarming control signal, e.g. refarming neighborhood messages. The pre-processing may be performed by the network entity before it forwards the network status information, e.g. the refarming neighborhood information or the refarming neighborhood messages to the respective destination. In one embodiment, any information from the OPS to the network is referred to as "refarming policy information" and any information from the network to the OPS is referred to as "refarming policy message".

According to an embodiment, the RNIS shares refarming neighborhood information of two different network operators. Hence, in this case the RNIS contains refarming neighborhood information of two combined networks, a first network and a second network. According to an embodiment the first network thereof operates according to the first communication technology and the second network operates according to the second communication technology.

According to a further embodiment, a master slave relationship is established between two network entities. For example, a master slave relationship is established between two RNIS of cooperating operators with regard to refarming policy information provided to the network access nodes (e.g. base stations) of both operators. In this way, it is possible to ensure basically the same user experience in the networks of cooperating operators.

According to an embodiment, refarming neighborhood information for different access technologies, and, according to a further embodiment for different radio access technologies, is organized in, at least virtually, different network entities (e.g. RNIS).

According to an embodiment of the first aspect, the network node to which the refarming control signal is provided, employs the second communication technology. In this case, the refarming control signal may include, according to an embodiment, an operating policy signal, which defines at least one decision parameter. On the basis of the at least one decision parameter, the network node initiates the reuse of the frequency resource by the second communication technology. According to an embodiment, the at least one decision parameter is a parameter for calculating a figure of merit for one cell (referred to as a first cell in the following) of a cellular communication network. The figure of merit is a measure of and is based (a) on a service quality provided by the first cell to at least one user equipment served by the first cell and (b) a service quality provided by at least one second cell to at least one user equipment served by the respective second cell. In other words, for each cell taken into account for calculating the figure of merith, a service quality provided by the cell to a user equipment served by the cell is determined and the resulting service qualities are combined to yield the figure of merit. Hence, in this sense the figure of merit is a measure for the combined service quality of the first cell and the at least one second cell. According to an embodiment, the first cell and the at least one second cell are neighboring cells.

The concept of the thus introduced figure of merit for a cell of a cellular communication network provides a flexible framework for employing a refarming policy for a dynamic frequency refarming in a communication network.

According to a further embodiment, the network node, to which the control unit provides the refarming control signal, employs the first communication technology. In this case, the refarming control signal according to an embodiment includes an operating policy signal defining at least one decision parameter on the basis of which the network node initiates release of the frequency resource by the first communication technology, e.g. by the network node employing the first communication technology. As specified beforehand, according to an embodiment, the decision parameter is in one embodiment a parameter for calculating the figure of merit of a cell of a cellular communication network.

According to a further embodiment of the first aspect, the network node is a network access node of a wireless communication network and the refarming control signal includes a coverage area setting signal requesting a change of a size of a coverage area of the network access node. For example, according to one embodiment the coverage area setting signal requests a reduction of the size of the coverage area of the network access node, thereby allowing reuse of its frequency resources by other network access nodes or other communication technologies in a larger (geographical) area.

According to a further embodiment, the refarming control signal includes a priority signal indicating which one of at least two frequency resources is to be used with a higher priority by the first communication technology. For example, if the first communication technology is known to be operating better in first portion of an available frequency spectrum than in a second portion of the spectrum, the priority indicating signal may indicate to the network node to use the first portion of the frequency spectrum with a higher priority. In this way, the available frequency spectrum can be used very efficiently even in the case of automatic, dynamic frequency refarming. It should be understood that although two portions of the frequency spectrum have been referred in the example, according to other embodiments three or more portions of the frequency spectrum may be associated with different priorities for different communication technologies. In this way, a flexible and efficient usage of the available frequency spectrum is obtained.

According to a further embodiment, the network entity according to the first aspect is itself a network node. For example, in one embodiment, the network entity is a network access node. Such an embodiment may be useful in a distributed control approach, where network nodes and in particular network access nodes or base stations of the communication network are communicating with each other to employ a certain refarming policy by exchanging respective network status information and refarming control signals.

According to further embodiments of the first aspect, the network entity includes features as disclosed with regard to the second aspect or an embodiment/example thereof below.

According to a second aspect of the herein disclosed subject-matter, a method of operating a network entity of a communication network is provided, the method comprising receiving network status information, providing a refarming control signal to a network node on the basis of the network status information, wherein the refarming control signal is related to a reuse of a frequency resource of a first communication technology by a second communication technology and wherein the first communication technology and the second communication technology are different. According to one embodiment, the refarming control signal may be or may comprise a policy imposing signal. According to a further embodiment, the refarming control signal may be or, in another embodiment, may comprise a signal triggering a refarming step.

As mentioned with regard to the first aspect, according to an embodiment the network entity is an entity of a cellular communication network comprising a plurality of cells. According to a further embodiment, the method according to the second aspect comprises determining a figure of merit for a first cell of said plurality of cells, the figure of merit being a measure of a combined service quality, wherein the combined service quality is a measure of (a) a service quality provided by the first cell to at least one user equipment served by the first cell and on (b) a service quality provided by a second cell of the plurality of cells to at least one user equipment served by the second cell. According to another embodiment, the combined service quality is based at least on (a) the service quality provided by the first cell to at least one user equipment served by the first cell and on (b) the service quality provided by a second cell of the plurality of cells to at least one user equipment served by the second cell. According to an embodiment, the service quality is a measure of the effective throughput in a cell versus the requested throughput.

In an embodiment, the figure of merit is determined in a network entity, e.g. in a network entity as disclosed herein, e.g. in a network entity as disclosed with regard to the first aspect. Hence, according to an embodiment, the refarming control signals may be determined on the basis of the figure of merit of the first cell. According to another embodiment the figure of merit is determined in a network node, e.g. in a network node as disclosed herein, e.g. a network node as disclosed with regard to the third aspect of the herein disclosed subject matter below.

It should be mentioned that although in the above it is referred to one second cell, the combined service quality may be based on the service quality provided by each of two or more second cells to at least one user equipment served by the respective cell. In one embodiment, the figure of merit takes into account the quality of service provided to each user equipment of the respective cell.

Such a figure of merit which takes into account the service quality, which is calculated for a subset of the cells of a cellular communication network provides for a certain frequency resource configuration, provides a flexible concept for refarming of frequency resources among different communication technologies. According to an embodiment, the at least one second cell may be a neighboring cell of the first cell. For example, in one embodiment the subset of cells consists of the first cell and its neighboring cells or, in another embodiment, of the first cell and part of its neighboring cells. In a further embodiment, the neighboring cells are cells directly adjacent to the first cell. According to other embodiments, the neighboring cells include next nearest neighbors of the first cell. According to a further embodiment, the neighboring cells include at least one cell that completely or partially overlaps with the first cell.

According to an embodiment, the figure of merit in the first cell is calculated as a weighted sum over the figures of merit of the first cell and the figures of merit in a set of neighboring cells. According to another embodiment, the figure of merit in the first cell is calculated by the weighted sum of a service quality measure in the first cell and a service quality measure of each cell of a set of neighboring cells.

Additionally or alternatively to the determination of the figure of merit of a first cell on the basis of the service quality provided by the subset of cells which are taken into account, the following embodiments may be employed to calculate the figure of merit or to refine the calculation of the figure of merit of a first cell.

According to an embodiment, the figure of merit of the first cell is charged (e.g. reduced in one embodiment) for frequency resources the base station controlling the first cells employs. The thus obtained figure of merit reflects to a certain extent the extent of usage of frequency resources for operating the first cell.

According to a further embodiment, the charging of the figure of merit of the first cell depends on network status information, e.g. on coverage areas obtained for frequency bands which are employed in the first cell. According to a further embodiment, the charging of the figure of merit of the first cell depends on the bandwidth of frequency bands employed in the first cell. According to a further embodiment, charging of the figure of merit of the first cell depends on the central frequencies of frequency bands employed in the first cell. According to a further embodiment, the charging of the figure of merit for the first cell depends on the radio access technology supported in the first cell. According to a further embodiment, the charging of the figure of merit of the first cell depends on operational costs of the first cell.

It should be understood, that the above examples of how the basic figure of merit can be modified by taking into account network status information is non-exhaustive and that other network status information can be taken into account in the afore-mentioned concept of figure of merit.

Further, while the above examples are taken into account by charging, e.g. reducing the figure of merit of the first cell, other parameters or parameter values may credit (e.g. increase) a given figure of merit of the first cell. For example, according to an embodiment the figure of merit of the first cell is credited based on the effective throughput achieved in the first cell. According to an embodiment, fixing of the credit in the figure of merit of the first cell is based on weighting the obtained effective throughput for a certain data service in the first cell for a certain user equipment. The weighting of the effective throughput depends e.g. on the radio access technology supported in the first cell, the user equipment, the user equipment capabilities and the frequency band employed for transmission.

According to a further embodiment, the fixing of the credit in the figure of merit of the first cell takes into account a maximum target throughput for a certain data service in the first cell and a certain user equipment. The maximum target throughput depends e.g. on the radio access technology supported in the first cell, the user equipment, the user equipment capabilities and the frequency band employed for a transmission.

The fixing of the credit in the figure of merit of the first cell according to a further embodiment takes into account a minimum target throughput for a certain data service in the first cell and a certain user equipment. The minimum target throughput depends in an exemplary embodiment on the radio access technology supported in the first cell and the user equipment, the user equipment capabilities and the frequency band employed for a transmission.

According to a further embodiment, the fixing of the credit in the figure of merit of the first cell takes into account a weighting of data services for a certain user equipment in the first cell in a measure of the combined service quality on user-level. The weighting of the data services in the combined service quality on user-level depends e.g. on the services, the user equipment and the first cell.

According to a further embodiment, the fixing of the credit in the figure of merit of the first cell takes into account a maximum target combined service quality on user-level for the user equipment in the first cell, which depends e.g. on the first cell and the user equipment.

According to a still further embodiment, the fixing of the credit in the figure of merit in the first cell takes into account a minimum target combined service quality on user-level for the user equipment in the first cell, which depends e.g. on the first cell and the user equipment.

According to a further embodiment, the fixing of the credit in the figure of merit of the first cell is performed by weighting the combined service measures for the user equipment and the first cell. The weighted combined service measure depends e.g. on the first cell and the user equipment. According to an embodiment, for calculating the figure of merit all user equipments in connected mode are taken into account. According to other embodiments, other criteria can be used to select the user equipments which are taken into account.

According to a further embodiment, more relevant user equipments are taken into account with a higher weighting factor.

It should be understood that the above list of examples how the credit in the figure of merit can be fixed, is non-exhaustive and that other parameters and other methods of fixing a credit in the figure of merit can be employed. Further, specific absolute or relative numbers for charging/crediting the figure of merit in the aformentioned embodiments may be set by respective refarming control signals, e.g. operating policy signals.

According to a further embodiment, the refarming control signals comprise handover signals for initiating a handover of a user equipment between two cells of the plurality of cells such that the figure of merit in the first cell is increased. The calculation of the figure of merit can be performed according to any embodiment/example specified herein or according to any combination of the herein disclosed embodiments and/or examples. However, in order to be able to compare the figure of merit before and after a handover, according to an embodiment the same calculation procedure is used for determining the figure of merit before and after the handover.

Hence, according to an embodiment, any of the above mentioned examples and embodiments for calculating a figure of merit of the first cell can be employed for calculating the figure of merit of the first cell.

Further, according to an embodiment providing the refarming control signals may include determining a figure of merit for at least two different configurations of the first cell and at least one surrounding cell and providing respective refarming control signals. The at least two different configurations may differ in use of frequency resources, use of communication technology on a specific radio resource, number of user equipments served by a specific radio resource, etc. As a result, by evaluating the figure of merit for at least two different cell configurations allows the selection of a configuration of the first cell and the at least one surrounding cell that results in a figure of merit that is increased with regard to a present figure of merit, i.e. a present configuration. Again it is mentioned that the concept of figure of merit, which is based on the quality of service of a first cell and at least one neighboring cell and, optionally on other factors, e.g. factors described above, provides an open and flexible concept, which can easily be adapted to any configuration of a communication network, wherein two different communication techniques are employed. In particular, embodiments of the herein disclosed subject-matter allow for a smooth and efficient transition from a first communication technology to a second communication technology and/or vice-versa.

According to a further embodiment, an optimization of the figure of merit in a first cell may comprise one or more of the following features:

First, the figure of merit of a given cell (referred to as "first cell") is evaluated, e.g. according to any of the above mentioned embodiments. Further, optionally an evaluation of load information from neighboring cells may be performed. For example, the aforementioned figure of merit may be credited or charged depending on the load information from the neighboring cells. Thereafter, a user equipment in the first cell and at least one potential candidate cell for handover may be selected based on the potential increase of the figure of merit of the first cell by a handover of the selected user equipment of the first cell to a candidate cell and the potential increase of the figure of merit in the candidate cell by said handover. In other words, according to an embodiment, the selection of a certain user equipment for a handover is performed on the basis on the figure of merit and its potential increase resulting from a handover.

According to a further embodiment, an initiation of a handover procedure for the selected user equipment is performed such that the figure of merit in the first cell is increased or, according to a further embodiment, is gradually approaching a local optimum. The initiation of the handover procedure can be performed according to any suitable embodiment of the herein disclosed subject matter, e.g. by respective refarming control signals or by a decision unit in a network node.

According to a further embodiment, the potential increase of the figure of merit for the selected candidate cell may be indicated to the base station controlling the selected candidate cell in the course of the handover procedure.

It should be understood that the handover procedure as such may be accompanied by respective messages as known in existing communication networks. For example, according to an embodiment the handover of a selected user equipment to the candidate cell is only performed if the handover is granted by the candidate cell.

According to a further embodiment of the second aspect, the refarming control signal includes an operating policy signal defining at least one decision parameter, on the basis of which the network node initiates release of the frequency resource of the first communication technology. For example, a decision parameter may be any parameter or parameter value used for calculating the figure of merit. For example, in one embodiment, a decision parameter is a weighting factor for calculating the weighted sum of the figures of merit/service quality measure of the first cell and the figures of merit/service quality measures of the set of neighboring cells.

According to an embodiment, the operating policy signal defines the at least one decision parameter initially or, in another embodiment, re-defines the at least one decision parameter. Hence, in one embodiment, a method for updating refarming policy information is provided. According to a further embodiment, a method for updating refarming policy information comprises receiving and evaluation of network status information, e.g. of refarming policy messages, and adjustment of refarming policy information in at least a part of the network, e.g. in a network node, according to the policy of the operator, and/or sending refarming policy information to the at least one part of the network, e.g. a network node, by a respective refarming control signal.

According to a further embodiment, the refarming control signal comprises an operation state setting signal for activating or deactivating an access node (e.g. a base station) of the communication system. Hence, according to an embodiment the refarming control signal according to the herein disclosed subject-matter may be configured for activating an access node, e.g. an access node for the second communication technology, if the figure of merit of a certain cell can be increased by activating such a network access node, i.e. by providing a cell operating according to the second communication technology. In addition to the activation of a network access node/establishment of a new cell, a handover of user equipments from an existing cell into the new cell may be initiated to thereby increase the figure of merit of the existing cell. Another example is that according to an embodiment a network access node may be deactivated if the figure of merit of a cell can be increased if the cell, which in one embodiment employs the first communication technology, is closed. Hence, embodiments of the herein disclosed subject-matter even provide for completely shutting off or for establishing cells which operate with a certain communication technology. However, even if such a cell, e.g. of first communication technology, is completely shut off, according to an embodiment of the herein disclosed subject-matter reactivating of the cell is enabled/possible in case that there is at least one user equipment capable of using only the first communication technology or which work more efficiently with the first communication technology. For example, the according to an embodiment, the operation state setting signal is configured for activating or deactivating an access providing capability of the network node. This allows the network node to reside e.g. in a stand-by mode.

The concept of figure of merit introduced above allows for adaption of the refarming policy to any situation with any desired policy and/or accuracy.

According to further embodiments of the second aspect, the method includes features as disclosed with regard to the first aspect or an embodiment/example thereof.

According to a third aspect of the herein disclosed subject matter there is provided a network node of a communication system. The network node comprises a control unit. The control unit is configured for receiving a refarming control signal, the refarming control signal being related to a reuse of a frequency resource of a first communication technology by a second communication technology, wherein the first communication technology and the second communication technology are different. The control unit is further configured for dynamically deciding, on the basis of the refarming control signal and during operation of the network node, on the use of the frequency resource of the first communication technology. For example, in one embodiment, where the refarming control signal contains only refarming policy information, but not a trigger signal, the control unit of the network node is according to an embodiment configured for evaluating the refarming policy information and generating a trigger signal for triggering the use of the frequency resource of the first communication technology. To this end, the control unit of the network node employs in an embodiment the figure of merit concept described with regard to the first aspect of the herein disclosed subject matter. In other words, the same procedures for determining the figure of merit of a cell as described with regard to the first aspect can also be employed to by the control unit of the network node, e.g. in a distributed control approach. Accordingly, the control unit of the network node may be configured for deciding on the use of the frequency resource of the first communication technology depending on a figure of merit of a current (actual) radio resource configuration and a figure of merit of a potential target radio resource configuration.

According to a further embodiment, the control unit is further configured for dynamically deciding on the use of the frequency resource of the first communication technology in response to the refarming control signal. According to a still further embodiment, wherein the refarming control signal includes a trigger signal, the control unit of the network node is configured for deciding to use the frequency resource of the first communication technology in response to receiving the trigger signal.

Generally herein, the term "deciding on the basis of" includes "deciding solely on the basis of" as well as "deciding, amongst other criteria, on the basis of".

According to an embodiment, the refarming control signal contains refarming policy information. The refarming control signal/the refarming policy information may be configured according to any embodiment or example disclosed herein.

According to a further embodiment, the control unit of the network node is configured for providing network status information, e.g. refarming policy messages, to at least one further network node and/or to at least one network entity. For example, according to an embodiment, the network node is a network access node and provides status information (e.g. quality of service information) about user equipments served by the network access node to the other network node/network entity such as the OPS.

According to a further embodiment, the control unit of the network node is configured for receiving by means of the refarming control signal local refarming information (e.g. information on load, interference) from at least one further network node, e.g. a neighbouring base station.

According to a further embodiment, the control unit is configured for providing a refarming control signal to another network node, e.g. to another network access node/base station. In this way, a distributed control approach can be realized. For example, in an embodiment, the control unit of the network node is configured for providing local refarming information (e.g. on load, interference) to at least one further network node, e.g. a neighbouring base station.

According to a further embodiment, the control unit of the network node is configured for receiving, by means of the refarming control signal, refarming neighbourhood information from at least one further network node/network entity, e.g. an OPS and/or RNIS.

According to a further embodiment, the control unit of the network node is configured for providing refarming neighbourhood information to at least one further network node/network entity, e.g. the OPS and/or RNIS.

According to a further embodiment, the control unit of the network node is configured for providing reports to OPS or RNIS which contribute to the available refarming neighbourhood information in a further network node/network entity, e.g. in the OPS and/or RNIS.

According to a further embodiment, the control unit of the network node is configured for evaluating the received refarming control signal (e.g. refarming policy information, refarming neighbourhood information and local refarming neighbourhood information) for selecting appropriate counterparts (e.g. at least one further network node and/or at least one network entity) and negotiating on frequency refarming with the selected counterparts. In other words, according to an embodiment, the control unit of the network node is configured for negotiating on exchange of channel resources with e.g. at least one further network node and/or at least one network entity.

According to a further embodiment, the control unit of the network node may provide an update request signal to at least one further network node/at least one network entity. According to an embodiment, the update request signal is configured for requesting a valid (i.e. an actual) refarming control signal from the respective network node/network entity. According to a further embodiment, the update request signal is configured for requesting updates of refarming information, e.g. refarming neighbourhood information.

According to a further embodiment, the network node is a network access node (e.g. base station of a wireless or cellular communication network) providing to user equipments access to the communication system. According to a further embodiment, the control unit is configured for activating or deactivating an access providing capability of the network node, e.g. a cell served by the network node or the whole access providing capability of the network node, in response to an operation state setting signal included in the refarming control signal.

According to further embodiments of the third aspect, the network node includes features as disclosed with regard to the fourth aspect or an embodiment/example thereof, below.

According to a fourth aspect of the herein disclosed subject matter, a method of operating a network node of a communication network is provided, the method comprising (a) receiving a refarming control signal, the refarming control signal being related to a reuse of a frequency resource of a first communication technology by a second communication technology, wherein the first communication technology and the second communication technology are different, and (b) dynamically deciding, on the basis of the refarming control signal and during operation of the network node, on the use of the frequency resource of the first communication technology.

In the following, exemplary examples are given to illustrate the operation of a network node according to embodiments of the herein disclosed subject matter. For example, according to an embodiment, the network node operates in accordance with a first communication technology. Hence in an example of the refarming control signal, the network node releases the frequency resource of the first communication technology on the basis of or in response to the refarming control signal. Such a case may arise if in a cellular communication network the figure of merit of a cell served by the network node can be increased by using the frequency resource of the first communication technology by a network node that employs a second communication technology. In another example of a refarming control signal, the network node reuses the frequency resource of the first communication technology on the basis of or in response to the refarming control signal. Such a case may arise if in a cellular communication network the figure of merit in of a cell served by the network node can be increased by using the frequency resource of the first communication technology indeed by the first communication technology (while presently the frequency resource may be used by the second communication technology).

In another example, according to an embodiment, the network node operates in accordance with the second communication technology. Hence in an example of the refarming control signal, the network node releases the frequency resource of the first communication technology on the basis of or in response to the refarming control signal. Such a case may arise if in a cellular communication network the figure of merit in of a cell served by the network node can be increased by using the frequency resource of the first communication technology by a network node which employs the first communication technology.

In another example of a refarming control signal, the network node reuses the frequency resource of the first communication technology on the basis of or in response to the refarming control signal. Such a case may arise if in a cellular communication network the figure of merit in of a cell served by the network node can be increased by using the frequency resource of the first communication technology by the second communication technology.

According to further embodiments of the fourth aspect, the method includes features as disclosed with regard to the third aspect or an embodiment/example thereof.

According to a fifth aspect, a communication system is provided, the communication system comprising at least one network entity according to the first aspect or an embodiment/example thereof and at least one network node according to the third aspect or an embodiment thereof.

According to a sixth aspect, a method for operating a communication system is provided, the method comprising the method according to the second aspect or an embodiment/example thereof and the method according to the fourth aspect or an embodiment thereof.

According to a seventh aspect, a computer program for processing a refarming control signal is provided, the computer program, when being executed by a data processor, is adapted for controlling the method as set forth in the second aspect or an embodiment/example thereof.

According to a eighth aspect, a computer program for processing a reframing control signal is provided, the computer program, when being executed by a data processor, is adapted for controlling the method as set forth in the fourth aspect or an embodiment/example thereof.

As used herein, reference to a computer program is intended to be equivalent to a reference to a program element and/or a computer readable medium containing instructions for controlling a computer system to coordinate the performance of the above described method.

The computer program may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

In the above there have been described and in the following there will be described exemplary embodiments of the subject matter disclosed herein with reference to a network entity, a method of operating a network entity, a network node, a method of operating a network node, a communication system and a method of operating a communication system. It has to be pointed out that of course any combination of features relating to different aspects of the herein disclosed subject matter is also possible. In particular, some embodiments have been described with reference to apparatus type claims whereas other embodiments have been described with reference to method type claims. However, a person skilled in the art will gather from the above and the following description that, unless other notified, in addition to any combination of features belonging to one aspect also any combination between features relating to different aspects or embodiments, for example even between features of the apparatus type claims and features of the method type claims is considered to be disclosed with this application.

The aspects and embodiments defined above and further aspects and embodiments of the present invention are apparent from the examples to be described hereinafter and are explained with reference to the drawings, but to which the invention is not limited.

DETAILED DESCRIPTION

Figure 1:
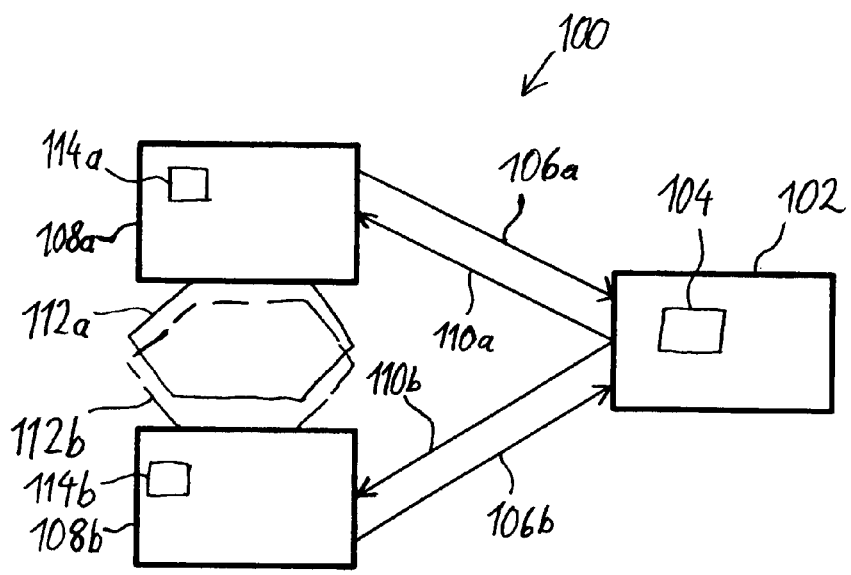
FIG. 1 shows a communication system according to embodiments of the herein disclosed subject matter.

The illustration in the drawings is schematic. It is noted that in different figures, similar or identical elements are provided with the same reference signs or with reference signs, which are different from the corresponding reference signs only within the first digit or in an appended character.

Embodiments of the herein disclosed subject matter are related to concepts for cognitive and dynamic inter-RAT and inter-RAT (RAT=radio access technology) frequency reframing in typical cellular system with a special focus on radio access networks (RAN) according to 3GPP standards like GSM, UMTS, LTE and their variants. However, the concepts, examples and embodiments disclosed herein can well be adapted to include other radio systems, such as WiMAX, WiFi, etc. The term "frequency refarming" according to an embodiment denotes the transition or handover of access rights to certain frequency resources from one base station to another base station. The holder of the access rights to certain frequency resources is entitled to transmit signals on an associated set of radio frequencies or frequency bands or composite carriers within some area around the base station and the boundary of this area may be defined by a threshold for the received signal strength of reference signals transmitted from the base station. The base stations may support the same RAT or different RAT. In the case of different RAT the two base stations need not necessarily be different physical units but may share—at least to some extent—the same hardware. In an embodiment, the term "base station" embraces all types of access nodes in wireless networks like NodeB, eNodeB, relay nodes etc.

Once a base station has gained access rights to additional frequency resources it may setup a new cell in this frequency range or may extend the system bandwidth, i.e. the used frequency band, of an existing cell under control of this base station. In future multi-band RAT a base station may control a plurality of frequency bands or carriers or composite carriers. In such a multi-band RAT the base station may use the granted frequency resources to activate an additional band or carrier or composite carrier for carrier aggregation.

FIG. 1 shows a communication system 100 according to embodiments of the herein disclosed subject matter.

The communication system 100 comprises a network entity 102 in the form of an operating policy server (OPS). However, it should be understood that a communication system may generally comprise more than one network entity. Furthermore, network entities which provide for a connection to a core network are not shown in FIG. 1.

The network entity 102 comprises a control unit 104. In accordance with embodiments of the herein disclosed subject matter, the control unit 104 is configured for receiving network status information 106a, 106b. In the illustrated scheme in FIG. 1, the network status information 106a, 106b is received from network nodes 108a, 108b, e.g. form a first network node 108a and a second network node 108b, as shown in FIG. 1. However, according to other embodiments, network status information may also be received from other network nodes, from a core network (not shown in FIG. 1), etc.

The first network node 108a operates with a first communication technology, e.g. GSM, and the second network node 108b operates with a second communication technology, e.g. UMTS.

In accordance with a further embodiment, the control unit 104 is further configured for providing a refarming control signal 110a, 110b to the network node 108a, 108b on the basis of the network status information 106a, 106b, i.e. by taking account the network status information 106a, 106b. In the exemplary case of FIG. 1, a refarming control signal is provided to the same network nodes 108a, 108b which have provided the control unit 104 with network status information. However, this is accidentally due to the limited number of network nodes shown in FIG. 1.

In the exemplary case of FIG. 1, the network status information 106a, 106b indicates to the control unit 104 that the load of a cell 112a which is served by the first network node 108a is low, whereas the load of a cell 112b served by the second network node 108b is high. According to an embodiment, the cell 112a of the first base station and the cell 112b of the second base station overlap each other geographically, as shown in FIG. 1. The overlap is large, i.e. larger than 50% of the area of the smaller cell overlaps the lager cell. According to other embodiments, the cells overlap only slightly or, according to other embodiments, do not overlap at all.

By any suitable evaluation process, e.g. by calculation of a figure of merit for the present configuration shown in FIG. 1 and for a possible target configuration, the control unit decides which frequency resource of the first base station 108a could be advantageously used by the second base station 108b. For example, according to an embodiment, the target configuration is chosen so as to increase the figure of merit. The figure of merit may be calculated according to any of the respective embodiments of the herein disclosed subject matter.

However, calculating a figure of merit is not mandatory. Rather, according to other embodiments, any parameter of the network status information, e.g. the load in a cell, may be used as decision parameter on the basis of which it is decided whether or not, and/or, according to other embodiments, to what extent frequency resources of the first base station 108a are refarmed to (i.e. which frequency resources are to be reused by) the second base station 108b.

However, the concept of the figure of merit provides a flexible and easily adaptable solution for optimizing a communication network in regard to frequency refarming.

Now, returning to FIG. 1, if the control unit 104 has decided to initiate a reuse of a frequency resource of the first communication technology by the second communication technology, i.e. by the second base station 108b, the control unit 104 provides to the first base station the refarming control signal 110a which requests the first base station 108a to release a radio resource of cell 112a. Upon reception of the release request, a control unit 114a of the first base station 108a decides on the basis of the refarming control signal 110a to release the requested radio resource and to send a respective confirmation to the network entity 102. For example, the control unit 114 may move one or more UEs residing on the requested radio resource to another radio resource handled by the first base station. If the release of the radio resource of the first network node 108a/cell 112a is confirmed by the first network node, the control unit 104 provides the refarming control signal 110b to the second network node 108b. The refarming control signal 110b requests the second network node 108b to use the frequency resource of the first communication technology which has been released by the first network node 108a. Upon receipt of the refarming control signal 110b, a control unit 114b of the second network node 108b decides, based on refarming control signal 110b, to use the frequency resource of the first communication technology by itself, i.e. by the second communication technology. Hence, the refarming control signals 110a, 110b are both related to a reuse of a frequency resource of the first communication technology, used by the first network node 108a in the first cell 112a, by the second communication technology used by the second network node 108b in the second cell 112b.

It should be mentioned that if the frequency resource that is released by the first network node is unused, no handover of a UE is necessary. In contrast, if the frequency resource, that is to be released by the first network node, is used by a UE, the UE is moved to another frequency resource of the first network node or, in another embodiment, a handover of the UE to a neighboring access network node (base station) is initiated.

Figure 2:
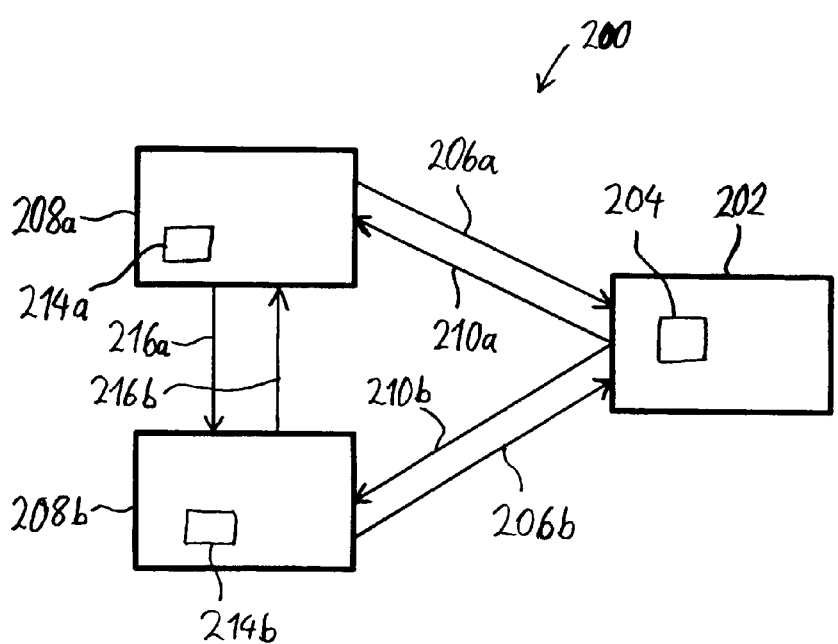
FIG. 2 shows a further communication system according to embodiments of the herein disclosed subject matter.

FIG. 2 shows a further communication system 200 according to embodiments of the herein disclosed subject matter. As indicated by similar reference signs, some elements shown in FIG. 2 are similar or identical to the respective elements in FIG. 1 and a description thereof is not repeated. Rather the differences between the communication system 100 in FIG. 1 and the communication system 200 in FIG. 2 are emphasized. For example, while the communication system 100 in FIG. 1 relates to a centralized system, wherein the frequency refarming is controlled by the control unit 104 of the network entity 102, the communication system 200 in FIG. 2 relates to a distributed system, wherein the frequency refarming is controlled in part by the network entity 202 and the network nodes 208a, 208b. However, the systems 100 and 200 in FIG. 1 and FIG. 2 are only exemplary to illustrate some embodiments of the herein disclosed subject matter.

The communication system 200 comprises a network node 202 in the form of an operating policy server (OPS) with a control unit 204. Further, the communication system 200 comprises a first network node in the form of a network access node 208a and a second network node in the form of a network access node 208b. Corresponding cells which are served by the network nodes 208a, 208b are not shown in FIG. 2. The control unit 204 of the network entity 202 receives network status information 206a, 206b from the network nodes 208a, 208b and provides in response hereto, refarming control signals 110a, 110b to the network nodes 208a, 208b.

In the case of FIG. 2, the refarming control signals 210a, 210b are policy imposing signals. For example, according to an embodiment, the refarming control signals are (or include) operating policy signals defining at least one decision parameter, on the basis of which the network nodes 208a, 208b initiate the reuse of the frequency resource by the second communication technology, i.e. by the second network node 208b.

Hence, in accordance with an embodiment, each of the network nodes 208a, 208b of the communication system 200 comprises a control unit 214a, 214b.

Each control unit 214a, 214b of the network nodes 208a, 208b is configured for receiving a refarming control signal, the refarming control signal being related to a reuse of a frequency resource of a first communication technology, employed by the first network node 208a, by a second communication technology employed by the second network node 208b.

The control unit 214a of at least one of the network nodes, e.g. of the first network node 208a, is further configured for dynamically deciding, on the basis of the refarming control signal 210a and during operation of the network node 208a, on the use of the frequency resource of the first communication technology. In the example shown in FIG. 2, the operating policy signals 210a, 210b define the method according to which the figure of merit is calculated. In the present case in FIG. 2, the figure of merit is calculated by the first base station 208a for the present configuration and for at least one target configuration that is obtained after a potential frequency refarming. If evaluation of the calculated figures of merit by the control unit 214 of the first base network node 208a indicates that the figure of merit can be optimized by frequency refarming, the first network node 208a decides to initiate the frequency refarming.

According to an embodiment, the control unit 214a of the first network node 208a is configured for providing a refarming control signal 216a to the second network node 208b, the refarming control signal 216a being a refarming trigger signal triggering the frequency refarming process. The control unit 214b of the second network node 208b is configured for providing a refarming control signal 216b to the first network node 208a. According to an embodiment, the refarming control signal 216b is a confirmation signal confirming reusage of the frequency resource of the first base station 208a by the second base station.

According to a further embodiment, the frequency refarming is reported by the first network node 208a and/or the second network node 208b to the control unit 204 of the network entity 202 which in response hereto updates the network status information stored therein and which in an embodiment also updates the frequency refarming policy. Hence, future refarming control signals provided by the control unit 204 of the network element 202 take into account the frequency refarming described so far with regard to FIG. 2.

Figure 3:
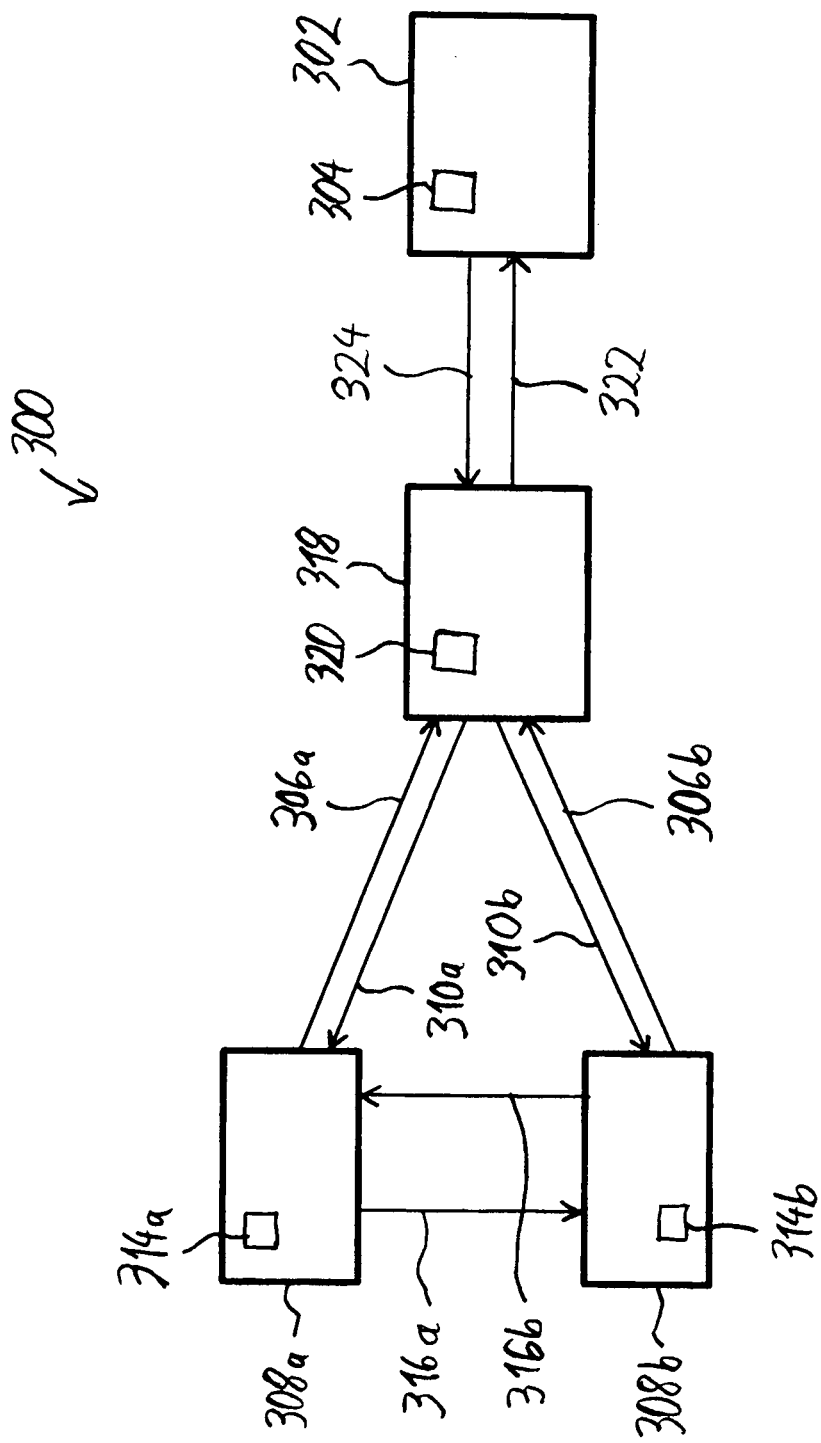
FIG. 3 shows a still further communication system according to embodiments of the herein disclosed subject matter.

FIG. 3 shows a further communication system 300 which is in accordance with embodiments of the herein disclosed subject matter. Most of the elements and signals of FIG. 3 correspond to respective elements in FIG. 2. These elements and signals have been associated with similar reference signs, the leading number of which is "3" and not "2" as in FIG. 2. The description of these elements and signals is not repeated. Instead, it is herewith referred to FIG. 2 for details thereof.

However, in contrast to FIG. 2, the communication system 300 in FIG. 3 comprises a network element 302 in the form of a refarming neighborhood information server (RNIS) 318. The RNIS 318 comprises a control unit 320 which is configured for receiving network status information, e.g. primary network status information 306a, 306b from the network access nodes 308a, 308b. Further, the control unit 320 of the RNIS 318 is configured for providing refarming control signals, i.e, in an illustrated embodiment, secondary refarming control signals 310a, 310b to the network nodes 308a, 308b. However, in contrast to the OPS 202 in FIG. 2, in an embodiment shown in FIG. 3 the RNIS 318 acts as a mediating node between network access nodes 308a, 308b and an OPS 302.

Further, the RNIS 318 contains network status information in the form of refarming neighborhood information. According to an embodiment, the refarming neighborhood information includes relationships/information on the neighborhood of network nodes which are associated with the RNIS. In this sense, an RNIS is responsible for a predetermined geographical area including the associated nodes 308a, 308b. The control unit 320 is thus configured for providing the refarming neighborhood information and the network status information 306a, 306b to the OPS 302 as secondary network status information 322. The OPS 302 receives the secondary network status information and provides in response hereto primary refarming control signals 324 to the RNIS 318, which here also acts as a network node in the sense of the herein disclosed subject matter. The RNIS 318 then forwards the primary control signals 324 to the network access nodes 308a, 308b as secondary refarming control signals 310a, 310b. According to an embodiment, the secondary refarming control signals 310a, 310b may further include refarming neighborhood information from the RNIS 318.

In the following, more detailed examples of how the herein disclosed subject matter may be implemented in a cellular communication system are provided.

Some embodiments of the herein disclosed subject matter are targeting at frequency refarming to improve overall spectrum efficiency or to facilitate other inter-RAT operating policy. Some embodiments focus on automatically removing/adding access rights to frequency resources from/to base stations.

In order to implement the concepts disclosed herein, according to an embodiment the following aspects are addressed:

1) New system information block is introduced in a target radio access technology (target RAT) to broadcast required information on the resource configuration after frequency refarming for facilitating UE to access the new frequency resources in an existing cell or to advertise the availability of a new cell in the target RAT.

2) New signalling procedures/messages/information elements between NB/eNB, RNC, SGSN, MME, or operating policy server, etc. are introduced to control specific frequency refarming operations. These messages/procedures may occur in the application layer (between operating policy server and MME, SGSN, etc.), S1 interface (between MME and eNB), Iu interface (between SGSN and RNC), A interface, interfaces for operation and maintenance, internal interfaces in the case of collocated base stations etc.

3) A scheme for identifying frequency resources, i.e. the frequency range and some geographical area where a base station may transmit and receive data in this frequency range is introduced.

Further embodiments relate to a cognitive frequency refarming scheme. Generally, cognitive Radio (CR) technology addresses the challenges of flexible, agile, scattered and wide usage of frequencies. Having regard to the herein disclosed subject matter, when the overall frequency allocation is fixed for an operator, frequency refarming cognitively adjusts frequency resources per RAT according to loads experienced in the RAT and frequency resource status.

Another application may be to reallocate access rights to frequency resources between RATs of different operators.

Embodiments of cognitive refarming procedures may comprise one or more of the following features:

1) A cognitive dynamic frequency assignment scheme without affecting incumbent services/users. For instance, the dynamic frequency assignment should be cognitive to the load per RAT, frequency usage per RAT, base station (BS) and user equipment (UE) hardware capabilities, multi-RAT capabilities of UE, etc. This feature may facilitate operators to smoothly phase out legacy RAT (e.g., PHS, GSM) and efficiently roll out new RAT (e.g., UMTS, LTE) with good site/antenna reuse.

2) A signalling procedure to facilitate removing/adding access rights to base stations in inter-RAT frequency refarming, according to an embodiment without of human intervention. New triggers, cell signalling procedures and information elements are defined according to illustrative embodiments.

The following exemplifies some embodiments for system information elements and signalling procedures of the herein disclosed subject matter for use in LTE. However, the underlying concepts can be adopted in other communication systems as well.

Exemplary Design of System Information Block of Dynamic Frequency

In LTE the basic configurations per cell indicate the radio resources information and system configurations defined in system information blocks according to a RRC protocol, such as LTE RRC protocol in TS 36.331 v8.3.0. For instance, MasterInformationBlock specifies the downlink (DL) system bandwidth. System information block type 2 includes an information element (IE) RadioResourceConfigCommon-SIB (SIB=system information block), which specifies PRACH, BCCH, PDSCH, PUSCH, and PUCCH configurations per cell, sounding reference symbol pattern, etc. Other SIBs include basic information of inter-frequency, inter-RAT adjacent cells for handover.

According to an embodiment, some frequency resource of a light-loaded RAT cell is moved to a heavy-loaded RAT cell. In this situation, refarming frequency introduces new radio resources in the target cell. The configurations on the refarming frequency need to be specified. In one proposed scheme, a new system information block is introduced to define the basic configurations (such as PHY/MAC/RLC/PDCP) of dynamic addition frequency in the RAT/cell (named "SystemInformationBlockDynamicFrequency" vs. traditional system information blocks specifying static frequency in the RAT). According to an embodiment, the dynamic frequency is a traffic-only carrier or, in another embodiment, a full-function carrier (carrying both signaling & traffic information) in the target RAT/cell.

In an exemplary embodiment, the "SystemInformationBlockDynamicFrequency" includes essential configurations of a newly-added refarming frequency, such as duplex scheme, uplink (UL) or downlink (DL), power control information, radio resource configuration, etc. Possible references are the existing information elements/messages in 3GPP TR 36.331 v8.3.0, RRC protocol of E-UTRAN, such as SystemInformationBlockType2, RadioResourceConfigCommon, RLC-Configuration, LogicalChannelConfig, MAC-MainConfiguration, PDCP-Configuration, etc. or RadioResourceConfigDedicated for in-bound handover UE.

The key point of new SIB definition is to provide basic information/configurations for the UEs to access the additional refarming frequency in the cell. Another point of introducing new "SystemInformationBlockDynamicFrequency" is to facilitate backward compatibility. Traditional (Rel-8) UEs work with static frequency by existing SIB information, which may be incapable to access dynamic frequency. New user equipments which are adapted to the concepts of the herein disclosed subject matter, e.g. CR-enabled UE, could access to static & dynamic frequency due to reading existing & new dynamic SIB information. Other variants are possible in implementation, i.e., extension of existing SIBs or other DL system broadcast schemes in the cell.

Further, according to an embodiment, a life time is specified for a dynamic frequency which is available for access by a UE. In an embodiment, specification of the life time is done by a life time information element of dynamic frequency, which is included in "SystemInformationBlockDynamicFrequency". According to other embodiments, the life time information element can be provided separately or in another message. Previous GSM/UMTS/LTE standard do not have such an IE due to static frequency per cell. Life time could get some variants, such as expired timer. In cognitive radio, frequency is dynamically allocated. Practical time scale could be about 1 day or more. The duration of the life time may be set up by the operating policy. According to an embodiment, the life time is specified in the refarming control signal provided by a network entity as defined herein, e.g by an operating policy server (OPS).

The Frequency Refarming Policies and Functions

The refarming policy imposed by the OPS is targeting at a flexible and efficient rearrangement of resources in the network. Some embodiments of the operating policy in a cognitive and automatic frequency refarming scheme are discussed in the following, while respective parameters/values may be set by respective operating policy signals, e.g. respective information elements:

1) Frequency refarming use cases:
   a) remove/add a component carrier for paired frequency if RAT supports carrier aggregation, (typical bandwidth of component carriers: 5 MHz for WCDMA, 5/10/15/20 MHz for LTE)
   b) remove/add unpaired carrier in underutilized/overloaded cell
   c) add component carrier for paired/unpaired spectrum to existing overloaded cell,
   d) close underutilized cell
   e) setup new cell for overloaded RAT
   f) any other additional frequency refarming in existing RAT/cells 2) The frequency refarming policy in the OPS may select the steps for frequency refarming according some priority list:
   a) Coverage first policy according to deployment situation (GSM is widely deployed, LTE is deployed in hot spot) or bit cost first policy or some service specific policy (such as MBMS) or phase out/roll out policy (operator may roll out new RAT and phase out legacy RAT step by step), etc. One or more of these examples may be associated with different priorities, depending on the policy which is to be followed.
   b) Different priorities for different RAT so that the OPS sends resource release requests preferably to cells of a low-priority RAT, e.g. PHS, TD-SCDMA, GSM1800 or GSM 900, HSPA, etc.
   c) Different priorities for different RAT so that OPS sends resource grant messages preferably to cells of a high-priority RAT, such as HSPA, LTE, WiMax, etc.

3) Criterion/threshold of triggering the signalling procedure: measurement period for load and frequency usage, thresholds and hysteresis range for preparation and refarming to prevent ping-pong effect, etc.

According to an embodiment, the frequency refarming procedures use some statistics on experienced loads, available resources, UE capabilities etc., wherein the parameters/values may be provided by a respectively configured refarming control signal or network status information as defined herein. For example such parameters/values include:

1) Frequency resource per RAT and cell: Collocating RAT systems (i.e., GSM, UMTS, LTE, etc.), cell/frequency number per RAT (i.e., 1, 2, 3), system bandwidth per Frequency/RAT cell (i.e., 5 MHz per GSM1800 cell)
2) Active UE number connecting to Frequency/RAT cell by RNC in UMTS or eNB in LTE
3) Inactive UE number camping to Frequency/RAT per tracking area (or estimated average UE load/cell/per area), ratio between active UEs & camping UEs by MME
4) Frequency usage (i.e., =frequency range used for data traffic in a cell/frequency range available in a cell) by NodeB or eNodeB For instance, load index of active UE per cell=number of active UE per cell/capacity of active UE per cell. Load index of camped UE per area=number of camped UE per area/ capacity of camped UE per area. However, the exact definition of network statistics could be altered according to the system under consideration.

According to embodiments, multi-frequency capability of RAT/cell in BS & UE constrains the frequency refarming scheme as follows.
1) Multi-frequency capability per RAT of BS: the BS supports frequency expanding per RAT or refarming frequency from certain RAT to another RAT, i.e., adding new frequency in certain RAT/cell according to an embodiment
2) Multi-frequency capability per RAT of UE:
    a) Single frequency per RAT: only access to certain frequency per RAT/cell. Constrain the frequency refarming if keeping the service.
    b) Multi-frequency per RAT: flexibly access to different frequency of RAT/cell(s) under instructions of network Therefore, according to an embodiment, the Operating policy server (OPS) keeps the BS/UE multi-frequency capability per RAT in a database. The above refarming functions are applicable to collocated multi-RAT BS. However, they may be applied to single-RAT BS with minor changes (refer to FIG. 1).

Exemplary Implementations

According to an embodiment, the frequency refarming procedures are at least in part controlled by a central network entity, the operating policy server (OPS), which may be located in the core network. Each OPS will control the refarming procedures associated therewith in a part of a network.

In a central control approach the OPS may not only impose the refarming policy itself on the controlled network part but may even trigger each frequency refarming step in the controlled network part based on the experienced network load and frequency usage in the various RATs. In contrast, in a distributed approach, other network nodes such as base stations may trigger at least part of the refarming steps.

The OPS may receive network status information, e.g. in the form of a base station information which characterizes the state of the cells controlled by the base station. Based on the received information the OPS may start to count and categorize the UE according the multi-frequency and multi-RAT capabilities in a cell or set of cells or tracking area. The OPS may initiate refarming steps when the number of UE or the load or the frequency usage in an evaluated cell or group of cells or tracking area falls below a certain refarming threshold for some period of time. The OPS may then send out resource release requests to identified underutilized cells. The affected cells may rearrange their current load according to the received resource release request. They may rearrange the current load to remaining carriers or frequency resources and they may initiate inter-frequency or inter-RAT handover in step S4.i below. Idle UEs refers to step S4.ii and S4.iii below. Finally, the identified underutilized cells may send a release grant message to the OPS and will no longer advertise the released resources in their system information. After receiving the release grant messages the OPS may decide to send resource grant messages for the said resources to currently overloaded cells of another RAT in this area and the selected cells may advertise the new frequency resources in their system information. For instance, the OPS may decide to grant a part of (e.g. 5 MHz) GSM 900 MHz band to UMTS 900 MHz cell.

Figure 4:
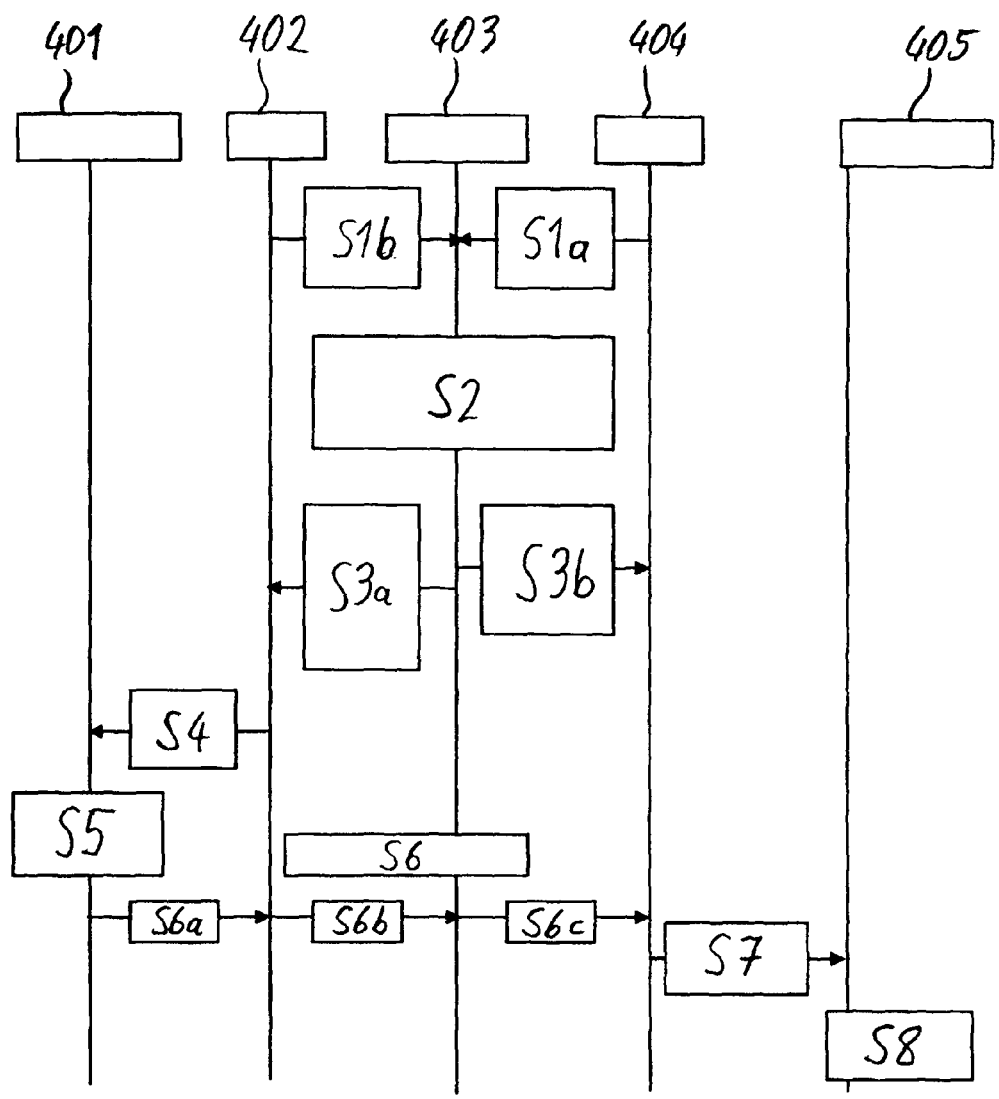
FIG. 4 shows a signalling procedure for dynamically releasing/adding frequency resources in an existing cell according to embodiments of the herein disclosed subject matter.

FIG. 4 shows a first example of signalling procedures for dynamically release/add frequency resources in existing cell.

The above description leads to new system information and signalling procedures which are in an embodiment used for network equipment (i.e., eNB, MME in LTE) to release/add dynamically access rights to frequency resources in inter-RAT refarming (FIG. 4). The following procedure, which is illustrated in FIG. 4, is only one example to illustrate some embodiments of the herein disclosed subject matter by referring to a central control approach for frequency refarming between RATs of the same operator. The procedure deals with frequency refarming between a UMTS and a LTE system. But similar procedures can be defined frequency refarming between the network nodes of other RAT like GSM, UMTS, LTE-A, etc.

Involved entities of the procedure in FIG. 4 are
   indicated at 401: a cell/network access node (node-B, NB), which shall release a frequency resource;
   indicated at 402: a radio network controller (RNC)/serving GRPS support node (SGSN)
   indicated at 403: an operating policy server (OPS)
   indicated at 404: a mobility management entity (MME)
   indicated at 405: a cell/network access node (enhanced node-B, eNB) to which a frequency resource shall be added.

In FIG. 4, the following steps are illustrated:
S1a: Monitor the load statistics of frequency/RAT per cell. For example, based on the configuration of operating policy server, MME (Mobility Management Entity) measures & reports the load of LTE/LTE-A frequency (active UE number/cell, frequency usage/cell, camped idle UE number/frequency/RAT/tracking area, etc.), multi-frequency/RAT capability of BSs (especially) & UEs, etc.
S1b: Monitor the load statistics of frequency/RAT per cell. For example, the SGSN (Service GPRS Support Node) collects similar load information of UMTS cells and reports to the policy server.
   a) MSC (Mobile Switching Center) collects similar load information in GSM (Global System for Mobile communications) network. Other equipment may have different node name.
   b) The report is regularly (by time interval) and/or event triggering (by threshold)
S2: Determine frequency refarming when the statistics satisfies a certain threshold. For example, when the network statistics of some frequency RAT/cell satisfy of frequency refarming policy for some time, the refarming policy server triggers the inter-RAT frequency refarming procedure, figures out frequency/RAT cell which shall release a frequency resource, target cell(s) to which UEs shall be redirected, frequency/RAT cell to which a frequency resource shall be added, based on the statistics.
S3a: Trigger frequency refarming, with cell ID & frequency ID to release, target cell of which UE are to be redirected. For example, the operating policy server (OPS) triggers the frequency refarming; sends a signalling message to frequency releasing RNC (in case of a UMTS system) with cell ID & frequency ID to release, targets a cell to which UEs shall be redirected.
S3b: Trigger frequency refarming, with cell ID and frequency ID to add. For example the operating policy server sends a signalling message to MME (LTE) of a frequency adding cell with cell ID & frequency ID (i.e., E-UTRA Absolute Radio Frequency Channel Number) to add.
S4: Redirect UEs in the emptying frequency resource/RAT to target cells. For example, a radio network controller (RNC)/node-B(NB) may redirect connected/camped UEs in the emptying frequency/RAT to target frequency/RAT cell(s) (either intra-RAT or inter-RAT cell), to empty the frequency/RAT.
- i. RRC connected UEs per cell of the emptying Frequency/RAT cell: aggregate UEs to target frequency/RAT cell by inter-frequency or inter-RAT handover procedure
- ii. Camped UEs in idle mode in a certain tracking area of the emptying Frequency/RAT cell: barring UEs select/reselect the Frequency/RAT by modifying system information of emptying frequency (cell). Then, sending paging notification to all idle UEs to follow the new system information per cell.
- iii. All (active & idle) UEs in tracking areas of the inter-frequency/inter-RAT cell of frequency-not-releasing: barring UEs select/reselect the emptying frequency/RAT cells by modifying system information of inter-frequency/inter-RAT cells, e.g. according to 3GPP TR 36.331 v8.3.0. Then, sending paging notification to all idle UEs to follow the new system information per cell.

S5: Release frequency resource, e.g. by shutting down cell or by change of dynamic SIB. For example NB releases frequency by shut down the frequency/RAT cell (i.e, single carrier per cell) or change dynamic SIB to release part of frequency resource in the frequency/RAT cell (i.e., multi-carrier per cell)

S6: Release successful report. For example, NB sends release successful report to RNC/SGSN (S6a), then to operating policy server (S6b), then to MME (S6c), according to an embodiment with the information of releasing RAT cell ID & frequency ID, etc.

S7: Instruct cell/eNB to add frequency. For example MME instructs the (LTE) network access node (enhanced node-B, eNB) to add frequency resource, maybe with the information of RAT cell ID & frequency ID to add the frequency resource, performs basic RAT configuration of the dynamic frequency, etc.

Figure 5:
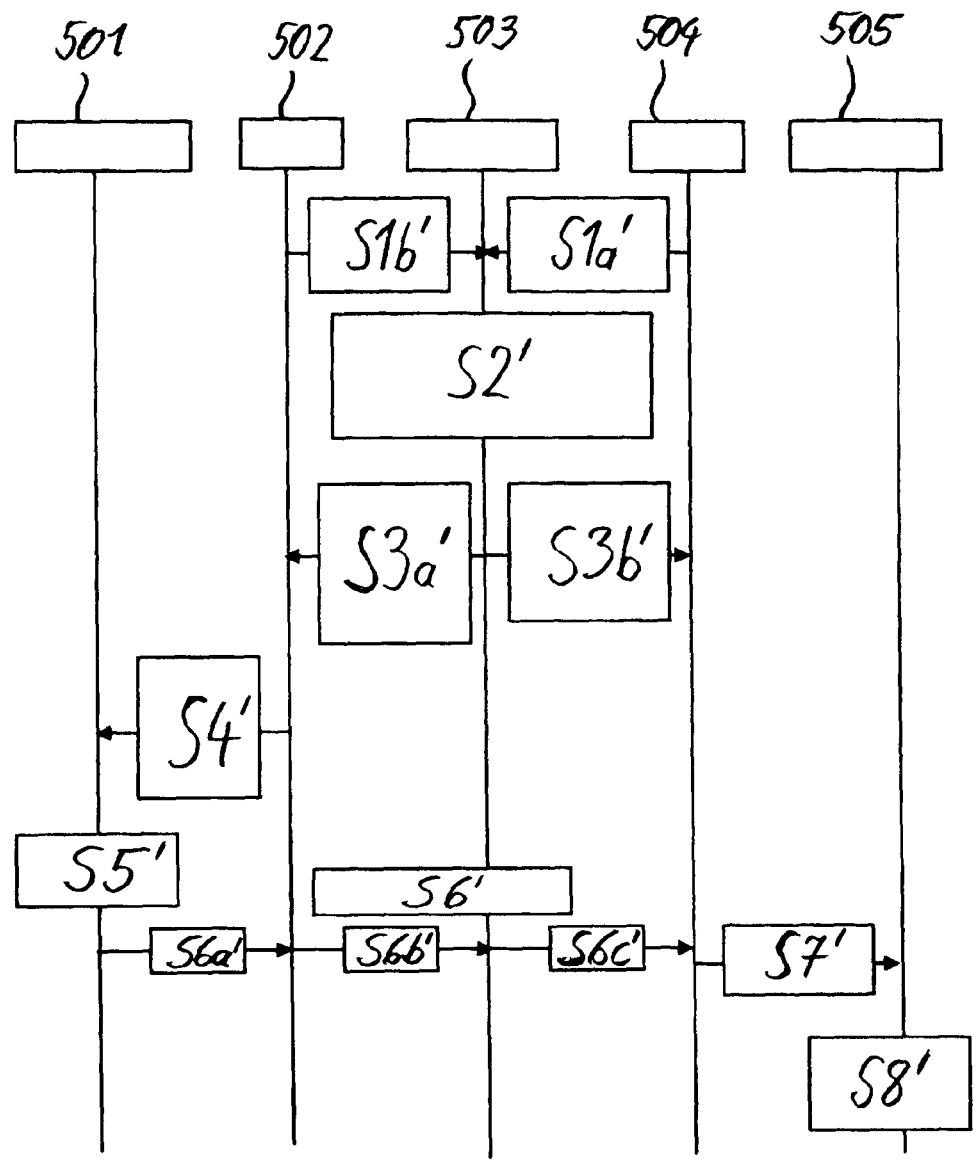
FIG. 5 shows a signalling procedure for dynamically releasing/adding a cell in frequency refarming according to embodiments of the herein disclosed subject matter.

S8: Broadcast SIB of dynamic frequency. For example Cell to-add-frequency broadcasts SIB of Dynamic frequency—"SystemInformationBlockDynamicFrequency", the frequency resource is available in the refarming cell FIG. 5 shows another example of signalling procedures according to embodiments of the herein disclosed subject matter. In particular, FIG. 5 shows signalling procedures for dynamically release/add cell in frequency refarming.

Following automatic removing/adding cell in frequency refarming as shown in FIG. 4 is only one example to illustrate the implementation between UMTS and LTE system. Similar procedures & network nodes exist among GSM, UMTS (such as NodeB, RNC), LTE-A, etc.

The acknowledge procedure/messages should be included in reliable signaling transmission. In some case, acknowledge message may include cell ID, eNB ID, and other important information (not only 1-bit ACK message). However, the acknowledge procedure is not shown in FIG. 5 to simplify the description.

Entities involved in the procedure of FIG. 5 are
indicated at 501: a cell/network access node (node-B, NB), which shall release a frequency resource;
indicated at 502: a radio network controller (RNC)/serving GRPS support node (SGSN)
indicated at 503: an operating policy server (OPS)
indicated at 504: a mobility management entity (MME)
indicated at 505: a cell/network access node (enhanced node-B, eNB) to which a frequency resource shall be added.

Basic signalling procedure steps/messages of the exemplary procedure shown in FIG. 5 are as follows:

S1a': Monitor the load statistics of frequency/RAT per cell. For example, based on the configuration of operating policy server, MME (Mobility Management Entity) measures & reports the load of LTE/LTE-A frequency (active UE number/cell, frequency usage/cell, camped idle UE number/frequency/RAT/tracking area, etc.), multi-frequency/RAT capability of BSs (especially) & UEs, etc.

S1b': Monitor the load statistics of frequency/RAT per cell. For example, SGSN (Service GPRS Support Node) collects similar load information of UMTS cells & report to policy server.
- a) MSC (Mobile Switching Center) collects similar load information in GSM (Global System for Mobile communications) network. Other system, such as access server in IEEE WLAN/WMAN system may need similar network load statistics report procedure/message.
- b) Operating policy server (OPS) may or may not be present in the procedure.
  - i. If OPS is present, procedures/messages in application layer should be defined. These procedures/messages could be standard or proprietary solution. So far, cell setup, etc. are mainly in operation & maintenance (O&M) procedure in proprietary solution. Implementing the frequency refarming policy in an O&M server could be advantageous. This O&M interface may be standard or proprietary.
  - ii. If OPS is not present, a refarming procedure according to the herein disclosed subject matter may be included in any existing network controller. For example a refarming procedure, e.g. a cognitive frequency refarming function, could be included in MME/SGSN/MSC, etc. These network controllers could negotiate the frequency refarming details according to pre-configured threshold (s) of network statistics. In an embodiment, some procedures/messages would be defined S3 interface (between MME & SGSN).
- c) According to an embodiment, new network statistics is defined:
  - i. Some new statistics is defined, such as one or more of idle UE number/tracking area (TA), UE multi-band/RAT capability, BS multi-band/RAT capability, BS IDs/TA, frequency/RAT allocation per BS in the TA, Upper limits of MME, frequency RAT cell capacity, PRB usage, UE numbers per QCI, etc. The tracking area is the areal resolution (typically several cells) known in the system for the location of a UE in idle mode. This information is needed for paging in order to reach a UE in idle mode when it is called.
  - ii. According to an embodiment, the statistics are averaged per cell or per TA. In some embodiments, TA may be better due to idle UE management per TA in MME and handover management in MME.
  - iii. Layer 2 measurement already includes PRB (physical resource block) usage, Number of active UEs, Packet Delay in the DL per QCI, etc. [TS 36.314 V8.2.0]
  - iv. Other new network statistics are possible beyond the above.
- d) According to an embodiment, a new signaling message is defined:
  - i. Measurement configuration/request message from policy server to MME then to eNB (in LTE), or from policy server to SGSN then to RNC (in UMTS), etc.
  - ii. Load report message from eNB to MME then to policy server (in LTE), or from RNC to SGSN then to policy server (in UMTS), etc.

e) The report is generated/provided to network nodes/entities regularly (by time interval) and/or event triggered, e.g. by a threshold.
   i. According to embodiments, the time interval/thresholds per cell/TA are configured from policy server, or preconfigured in eNB.
   ii. Multi-threshold and hysteresis time are possible, such as threshold for refarming preparation & refarming. Ping pong effect should be avoided.
   iii. The threshold could be an absolute traffic load or relative load in overall traffic.

S2': Determine frequency refarming when the statistics satisfies a certain threshold. Figure out emptying frequency resource/RAT cell, redirect target cell, refarm frequency resource/RAT cell. For example, when the network statistics of some frequency resource/RAT cell satisfies a frequency refarming policy for some (e.g. a predetermined) time, the operating policy server triggers inter-RAT frequency refarming procedure, figures out frequency/RAT cell to release frequency, target cell(s) of UEs to be redirected, frequency/RAT cell to which frequency shall be added, based on the statistics.
   a) The frequency refarming policy is important here. Cell-to-be-released is light loaded. Redirect target cell is normal operating cell. RAT Cell-to-be-setup is heavy loaded. In general, Redirect target cell(s) & heavy load cell(s) offload major traffic.

S3a', S3b': According to an embodiment, the operating policy server sends a new signaling message to both sides:

S3a' Trigger frequency refarming, according to an embodiment with cell ID and frequency ID to release, target cell of UEs to be redirected. For example, send cell release request message to release frequency: i.e., from policy server to RNC in UMTS, including cell ID & frequency ID to release, target cell of redirect UEs;

S3b': Trigger frequency refarming, according to an embodiment with cell ID and frequency ID to add. For example, send cell setup preparation message to add frequency: i.e., from policy server to MME in LTE, including new cell ID by certain RAT & frequency ID (such as E-UTRA Absolute Radio Frequency Channel Number).

S3a', S3b':
   i) Transparent transmission of application layer (O&M) signaling message is possible.
   ii) If no operating policy server is present, similar signaling procedure is needed between the 2 RAT systems. The coordinator (i.e., MME) may send message to SGSN by S3 interface or vice versa.

S4': Redirect UEs in the emptying frequency resource/RAT to target cells. For example, according to an embodiment, the emptying frequency/RAT system (i.e., RNC/NB) redirects connected/camped UEs to target frequency/RAT cell(s) (either intra-RAT or inter-RAT cell), empty the frequency/RAT.
   a) Neighbour cells (of frequency-not-releasing) update their neighbour cell lists & their SIBs for cell reselection:
      i. The releasing cell(s) make its neighbour cells to update their neighbour cell list to remove the releasing cell(s)→no UE could handover to the releasing cell. (If releasing is TA by TA, neighbour cells in the releasing TA ignore the message)
      ii. The SIBs for cell reselection in neighbour cell(s) updated: remove the releasing cell in these SIBs, Then, send paging notification to all UEs to follow the new system information per cell→no idle UE selects/reselects the releasing cell
   b) The releasing cell updates its SIB. Then, send paging notification to all idle UEs to follow the new system information per cell:
      i. the cell is barred→no new idle UE selects/reselects the releasing cell & instructing camped UE reselects other available frequency/RAT cells
         a) Set the IE "cellBarred" to barred in SIB1 of LTE/frequency cells
         b) Similar RRC signalling scheme to bar idle UEs select the emptying cell in GSM, HSPA, CDMA system, etc.
   c) Inter-frequency or inter-RAT handover the connected UEs in the emptying Frequency/RAT cell: New handover cause "frequency refarming" is possible.

S5': Release frequency resource by shut down cell or change dynamic SIB. For example according to an embodiment, the NB releases frequency by shut down the frequency/RAT cell (i.e., while single carrier per cell)
   a) Cell release procedure/message could be defined from MME to eNB in S1 interface (LTE), or from RNC to NB in Iu interface (UMTS), etc.

S6': Relase successful report. For example, according to an embodiment, the NB sends cell release successful message to RNC (by Iub interface) (S6a'), then to SGSN (by Iu interface), then to operating policy server (by application interface) if present (S6b'), then to MME (by application interface) (S6c'), according to an embodiment with the information of releasing RAT cell ID & frequency ID, etc.
   a) Similar messages could be defined in LTE (GSM, etc.) system, i.e., from eNB to MME (by S1 interface), from MME to policy server.
   b) Some variants are possible, such as MME & SGSN talk on S3 interface if no policy server in the conversation.

S7': Instruct cell/eNB to add frequency. For example, according to an embodiment the MME instructs the eNB (in case of a LTE system) to setup a new cell on the refarming frequency, may with the information of cell ID, basic configurations of the cell (such as system information blocks), etc.

S8': New cell is available on the refarming frequency
   a) SIBs of the new cell is broadcasted→UE can access the new cell.
   b) The adjacent cells update their neighbor cell lists→UE can handover to this cell.

In FIG. 4 and FIG. 5 above, in order to demonstrate the main information flow, single-end arrows are employed, indicating a single direction message. However, according to another embodiment, two-direction signaling message is possible in each step. For instance, operating policy server may send message to RNC or MME to configure the report interval or event trigger threshold to monitor the load statistics of frequency/RAT per cell. RNC or MME send the load report to the server in step 1. Moreover, the acknowledge messages for different steps are not illustrated in reliable signalling procedure.

Distributed Control Approach

In the following, exemplary embodiments of the herein disclosed subject matter are described with reference to a distributed control approach. However, as is apparent from the above many concepts of the central control approach are applicable to the distributed control approach and vice versa.

In a distributed control approach the OPS may only provide some input, parameters, thresholds, guidelines etc., which define the refarming policy for procedures which are locally evaluated in or between base stations. The OPS will receive reports from the base stations characterising the current network status and OAM (operation administration and maintenance) information or any other information required to select the appropriate refarming policy. Such information from the OPS to the network is in the following referred to as "refarming policy information". Any information from the network to the OPS is in the following referred to as "refarming policy message". Functions in the network access nodes, e.g. in the base stations, may evaluate and trigger local procedures and may use for instance load and interference information which may be exchanged between neighbouring base stations in addition to the refarming policy information provided by the OPS. The information exchanged between neighbouring base stations for executing those local procedures is in the following referred to as "local refarming information". But the distributed control approach may additionally employ "refarming neighbourhood information". This information resides in an embodiment of the central control approach in the OPS and comprises all or part of the information on neighbourhood relationships the OPS may need to select the involved base stations for a certain frequency refarming step, i.e. the current holder or holders of a frequency resource and the new holder or holders to which the frequency resource will be granted. The refarming neighbourhood information includes basically static or at least semi-static information on the base stations, like the location of a base station and path loss information to neighbouring base stations, information on supported RAN and supported frequency bands or composite carriers, activity state of a base station etc. In the distributed control approach the relevant part of the refarming neighbourhood information needs to be available to each base station to enable the base station to select (or negotiate with) appropriate counterparts in the local procedures for frequency refarming. The base stations in the distributed control approach may be enabled to request updates of the relevant refarming neighbourhood information if needed or may receive such updates periodically. The complete refarming neighbourhood information may in the distributed control approach still reside in the OPS. But response times for refarming neighbourhood information updates may be improved when the refarming neighbourhood information for certain geographical areas resides in a dedicated refarming neighbourhood information server (RNIS). The RNIS being responsible for neighbouring geographical areas may be inter-connected to each other. They may provide the OPS with required information for updating the refarming policy information in the OPS and they may route the refarming policy information to the base stations in their geographical area. The RNIS may perform some preprocessing on refarming policy messages received from the base stations of their geographical area and destined to the OPS. The RNIS may elaborate some basic refarming policy information received from the OPS and provide elaborated refarming policy information to the base stations in their geographical area.

Frequency refarming is a means which may be used for ensuring efficient frequency use and a smooth transition from the deployment of a legacy RAT to the deployment of an emerging RAT according to the ever increasing/decreasing availability of UE supporting the emerging/legacy RAT. In such a situation two operators may settle an agreement to ensure basic coverage of the emerging/legacy RAT even during the begin/end of an emerging/legacy RAT roll-out/phase-out. The operators may in this case jointly operate an OPS to impose some agreed basic refarming policy information on the combined network of both operators. Such a common policy may specify the bands which are preferably assigned to which RAT in a certain geographical area, preferred cell sizes per RAT, the allowed maximum throughput per UE, a guaranteed minimum service quality etc.

The operators may maintain separate RNIS in a geographical area. These RNIS may share the refarming neighbourhood information of the combined networks in this geographical area. The RNIS of each operator may elaborate the basic refarming policy information independently and may impose the respective elaborated refarming policy information on the respective operator's network. Alternatively, the OPS may temporarily impose a master-slave relationship between the RNIS of both operators. The master RNIS may in this case elaborate the basic refarming policy information for the networks of both operators and the RNIS may share the refarming neighbourhood information of the combined network. The operators may employ such a master-slave relationship between the RNIS only for one RAT, while the other RAT is supported independently by the RNIS of each operator. The refarming neighbourhood information in the RNIS is therefore preferably organized such that each RAT in the network of an operator can be served by, at least virtually, different RNIS. These RNIS may reside preferably in the same unit.

Establishing a master-slave relationship between the RNIS of different operators serving the same RAT may be beneficial for the emerging RAT at the begin of its roll-out when the coverage for the emerging RAT is still limited in both networks. In this phase it may be helpful to employ the same policy, e.g. service profiles per UE in the cells of both operators as frequent handover or cell reselection to the other operator's network may be needed since the coverage for the new RAT in the network of each operator is not yet sufficient, and ensuring the same or a similar policy in the cells of both operators may minimize the effect such a handover or cell reselection may have on the service quality experienced by UE.

At the end of the phase-out the same argument applies to the networks of the legacy RAT and the operators may decide to impose a maser-slave relationship on their RNIS serving the legacy RAT.

The local procedures for negotiating access rights to frequency resources between the base stations need to be devised such that the achieved frequency resource allocation allows for good or at least sufficient user experience for legacy RAT and emerging RAT in the whole area. To this end the refarming policy information may include the definition(s) of cost function to optimize the distributed frequency refarming. A typical figure of merit $G_c(c)$ for a base station to control cell c is defined to evaluate in the course of the local negotiation procedures. The figure of merit $G_c(c)$ is defined such that its value is high if the service quality in cell c is high and access to frequency resources is low in cell c. In this figure of merit $G_c(c)$ cell c may be charged for access rights to frequency resources its base station holds and may be credited according a measure which is basically related to the effective throughput, i.e. successfully transmitted and received information or data, handled on the frequency resources of cell c.

The following equations exemplify a an embodiment of a basic mathematical foundation for a figure of merit $G_c(c)$ which may be employed to enforce the above mentioned principles on a set of cells supporting dynamic frequency refarming.

$G_{s,u,c}^{(0)}(s,u,c)$ specifies the basic figure of merit for providing service s for UE u in cell c, where $r_{s,u,c}(s,u,c)$ is the obtained data rate for this service, i.e. the effective throughput in bit per time unit, and the weighting factor $g_b(s,u,c,b)$ considers the frequency band b or composite carrier employed for the data transmissions for service s and user u in cell c on the air interface. The weighting factor $g_b(s,u,c,b)$ allows to define general preferences of service s, user u and cell c for certain frequency bands or composite carriers b or it may just consider a numbering of the frequency bands or composite carriers according to the order the frequency bands or composite carriers have been granted to a base station or cell with $g_b$(s, u,c,b)>$g_b$(s,u,c,b+1), i.e. a data rate on a previously selected frequency band or composite carrier is rated higher than the same data rate on the last selected frequency band or composite carrier. The resource scheduler in cell c which is allocating channel resources on the radio interface, i.e. radio frequencies, transmission time and codes, to services and UE in cell c will therefore preferably avoid allocation of radio frequencies on the last selected frequency band or composite carrier and it will release the last selected frequency band or composite carrier when the associated channel resources are no longer needed.

$$G_{s,u,c}^{(0)}(s,u,c,b) = g_b(s,u,c,b) r_s(s,u,c) \quad \text{Eq. 1}$$

$G_{s,u,c}^{(1)}(s,u,c)$ specifies a refined definition of the figure of merit in Eq. 1, where $r_{s,max}(s,u,c)$ is the target value of the maximum supported data rate for service s and UE u in cell c. $r_{s,max}(s,u,c)$ may depend on the RAT served in cell c. The resource scheduling policy of an operator may primarily target at ensuring some basic coverage for service s in the cells of the legacy RAT while it may target at providing a high data throughput for service s in the cells of the emerging RAT. Consequently, a higher threshold $r_{s,max}(s,u,c)$ may be selected in the cells of the emerging RAT than in the cells of the legacy RAT.

$$G_{s,u,c}^{(1)}(s,u,c) = g_b(s,u,c,b) \min(r_s(s,u,c), r_{s,max}(s,u,c)) \quad \text{Eq. 2}$$

$G_{s,u,c}^{(2)}(s,u,c)$ specifies a refined definition of the figure of merit in Eq. 2, where $r_{s,min}(s,u,c)$ is the target value of the minimum supported data rate for service s and UE u in cell c. Negative values in the else branch basically increase the significance of service s in a combined figure of merit considering all services of UE u in cell c once the obtained data rate falls below $r_{s,min}(s,u,c)$.

target rate $r_{s,min}(\sigma,u,c)$ for service σ. The value 0 in Eq. 4 and the rule for setting this value therein is taken as an example only to show how a figure of merit can include the significance of services with a guaranteed bit rate in its definition.

Alternatively, one may consider to calculate separate figures of merit, one figure of merit for services with guaranteed bit rate and another one for services without guaranteed bit rate. The target in such a configuration may be to maximize first the figure or merit for the services with guaranteed bit rate before services without guaranteed bit rate are considered. The figures of merit for services with guaranteed bit rates and services without guaranteed bit rates may be combined by an appropriate weighting.

$$G_{s,u,c}^{(3)}(s,u,c) = \begin{cases} 0 & \text{for } G_{s,u,c}^{(2)}(\sigma,u,c) < 0 \text{ and } s \neq \sigma \text{ and } \sigma \in S_{GBR}(u,c) \\ G_{s,u,c}^{(2)}(s,u,c) & \text{else} \end{cases} \quad \text{Eq. 4}$$

$G_{u,c}^{(0)}(u,c)$ specifies the basic figure of merit as a quality measure for the total service provided to UE u in cell c as a weighted sum over the figures of merit of the services activated in cell c for UE u. The weighting factors $g_s(s,u,c_1)$ and $g_s(s,u,c_2)$ in two cells $c_1$ and $c_2$ for the same service s and UE u in the same area may depend on the RAT served in the cell. The channel resource scheduling policy of an operator may target at running low data-rate services, like speech, primarily in cells of the legacy RAT while high-data rate services in the same area may preferably be handled in cells of the emerging RAT. This policy may be imposed on the network by selecting higher weighting factors $g_s(s,u,c)$ for low data-rate services s in the cells of the legacy RAT in comparison to the weighting factors for low data-rate services s in cells of the emerging RAT.

$$G_{u,c}^{(0)}(u,c) = \sum_{s \in S(u,c)} g_s(s,u,c) G_{s,u,c}^{(3)}(s,u,c) \quad \text{Eq. 5}$$

$G_{u,c}^{(1)}(u,c)$ specifies a refined definition of the figure of merit in Eq. 5 as a quality measure for the total service provided to UE u in cell c, where $G_{u,max}(u,c)$ is the target value of the maximum supported quality measure for UE u in cell c. $G_{u,max}(u,c)$ may depend on hardware capabilities of UE u. UE supporting the emerging RAT should preferably be handled in cells of the emerging RAT in areas where such a cell is available and not attach to cells of the legacy RAT even though the UE may support the legacy RAT as well. A low value $G_{u,max}(u,c)$ in cell c providing access to the legacy RAT is a means for ensuring that such a dual-RAT or multi-RAT UE u attaches preferably to cells of the emerging RAT, at least when requesting for high data-rate services.

$$G_{s,u,c}^{(2)}(s,u,c) = \begin{cases} G_{s,u,c}^{(1)}(s,u,c) & \text{for } G_{s,u,c}^{(1)}(s,u,c) \geq g_b(s,u,c,b) r_{s,min}(s,u,c) \\ G_{s,u,c}^{(1)}(s,u,c) - g_b(s,u,c,b) r_{s,min}(s,u,c) & \text{else} \end{cases} \quad \text{Eq. 3}$$

$G_{s,u,c}^{(3)}(s,u,c)$ specifies a refined definition of the figure of merit in Eq. 3, where the figure of merit for service s of UE u in cell c is set to 0 even though the obtained data rate of service s is basically fully sufficient, once the obtained data rate for at least one service σ in the set of services $S_{GBR}(u,c)$ with guaranteed bit rate for UE u in cell c falls below the minimum $$G_{u,c}^{(1)}(u,c) = \min(G_{u,c}^{(0)}(u,c), G_{u,max}(u,c)) \quad \text{Eq. 6}$$

$G_{u,c}^{(2)}(u,c)$ specifies a refined definition of the figure of merit in Eq. 6 as a quality measure for the total service provided to UE u in cell c, where $G_{u,min}(u,c)$ is the target value of the minimum supported quality measure for UE u in cell c. Negative values in the else branch basically increase the significance of UE u in a combined figure of merit considering all UE in cell c once the obtained quality measure falls below $G_{u,min}(u,c)$.

$$G_{u,c}^{(2)} = \begin{cases} G_{u,c}^{(1)}(u, c) & \text{for } G_{u,c}^{(1)}(u, c) \geq G_{u,min}(u, c) \\ G_{u,c}^{(1)}(u, c) - G_{u,min}(u, c) & \text{else} \end{cases} \quad \text{Eq. 7}$$

$G_{u,c}^{(3)}(u,c)$ specifies a refined definition of the figure of merit in Eq. 7 as a quality measure for the total service provided to UE u in cell c, where the quality measure of UE u in cell c is set to 0 even though the obtained quality measure for UE u is basically fully sufficient, once the obtained quality measure for at least one UE $\upsilon$ in a set of UE $U_{GQ}(c)$ with guaranteed quality measure in cell c falls below the minimum target quality measure $G_{u,min}(\upsilon,c)$ for UE $\upsilon$. Eq. 8 and in particular the value 0 therein and the rule for setting this value is taken as an example only to show how a figure of merit can include the significance of UE with a guaranteed quality measure in its definition.

Alternatively, one may consider to calculate separate figures of merit for different classes of UE. The target in such a configuration may be to maximize first the figure or merit for the most privileged UE classes before less privileged UE classes are considered. The figures of merit for the various UE classes may be combined by an appropriate weighting.

$$G_{u,c}^{(3)}(u, c) = \begin{cases} 0 & \text{for } G_{u,c}^{(2)}(\upsilon, c) < 0 \text{ and } u \neq \upsilon \text{ and } \upsilon \in U_{GQ}(c) \\ G_{u,c}^{(2)}(u, c) & \text{else} \end{cases} \quad \text{Eq. 8}$$

$G_c^{(0)}(c)$ specifies the basic figure of merit as a quality measure for the total service provided to all UE in cell c as a weighted sum over the figures of merit of all UE served in cell c. The weighting factors $g_u(u,c_1)$ and $g_u(u,c_2)$ in two cells $c_1$ and $c_2$ for the same UE u in the same area may depend on the inter-RAT capabilities of UE u. Serving a UE supporting only the legacy RAT in a cell may be weighted higher in a cell providing access to the legacy RAT than serving a UE supporting both the legacy RAT and the emerging RAT.

$$G_c^{(0)}(c) = \sum_{u \in U(c)} g_u(u, c) G_{u,c}^{(3)}(u, c) \quad \text{Eq. 9}$$

$$G_c^{(1)}(c) = G_c^{(0)}(c) - C_c(c, \underline{B}_w, \underline{f}_{CC}, \underline{P}_{TX}, C_{OP}) \quad \text{Eq. 10}$$

$G_c^{(1)}(c)$ in Eq. 10 specifies a refined definition of the figure of merit in Eq. 9 where $C_c(c, \underline{B}_w, \underline{f}_{CC}, \underline{P}_{TX}, C_{OP}) \geq 0$ is a cost function charging cell c or the base station controlling cell c for holding access rights to frequency resources and for operational costs $C_{OP}$. Vector $\underline{B}_w$ denotes the bandwidths of the various allocated frequency bands or composite carriers in cell c, vector $\underline{f}_{CC}$ denotes the centre frequencies of allocated bands or composite carriers and vector $\underline{P}_{TX}$ denotes the DL transmission powers employed for instance on reference symbols on the various bands or composite carriers as a measure of the obtained coverage area. The cost function will basically increase with the total bandwidth in the allocated frequency bands or composite carriers and the obtained coverage areas in the various bands as exemplified in Eq. 11 for an active set of frequency bands or composite carriers B(c)

where the value of $\rho(b)$ may depend on the propagation characteristics in the area of cell c and frequency band or composite carrier b.

$$C_c(c) = C_{OP}(c) + \sum_{b \in B(c)} c_b(c, f_{CC}(b)) B_w(b) P_{TX}(b)^{1/\rho(b)} \quad \text{Eq. 11}$$

The weighting factors $c_b(c, f_{CC}(b))$ allow to control the size of the coverage areas of frequency bands or composite carriers b in cell c. Higher weighting factors $c_b(c, f_{CC}(b))$ will lead to smaller coverage areas and may be applied for additional cells or frequency bands in hot spot areas. The resource scheduler in cell c will try to optimize $G_c^{(1)}(c)$ in Eq. 10 by applying the available channel resources in frequency, time and code domain in cell c such that the data throughput in cell c, basically expressed by $G_c^{(0)}(c)$, is maximized while the cost function according Eq. 11 is to be minimized. With higher weighting factors $c_b(c, f_{CC}(b))$ the optimum $G_c^{(1)}(c)$ is reached for smaller transmission powers $\underline{P}_{TX}$, and thus smaller coverage areas. The allocation of channel resources by the resource scheduler is characterized by the modulation and coding schemes employed for the connections between the base station and the UE.

The cost function $C_c(c, \underline{B}_w, \underline{f}_{CC}, \underline{P}_{TX}, C_{OP})$ may be devised such that certain frequency resources or frequency bands or composite carriers are preferably used for the legacy RAT and others for the emerging RAT. It may for instance be preferable to allocate the bands with lower centre frequencies, and thus less path loss, to cells of the legacy RAT which will typically feature bigger cell sizes.

$G_c(c)$ specifies the final figure of merit for cell c as a weighted sum of the figures of merit according Eq. 10 over the set of neighbouring cells N(c). Weights $g_c(\gamma)$ may consider the overlap of the coverage areas of cells $\gamma$ and cell c which may be estimated based on measurement reports on neighbouring cells from UE. The operator may rate cells of its own network higher than neighbouring cells of another operator. Furthermore cells holding access rights to radio frequencies or a frequency band or a composite carrier designated to ensure some basic service to either the legacy or the emerging RAT in an area may be weighted higher than cells which to not hold access rights to such frequencies. The set of neighbouring cells may be predefined and may be provided in the refarming neighbourhood information from the RNIS and may be combined with measurement reports on neighbouring cells from UE served in cell c.

$$G_c(c) = \sum_{\gamma \in N(c)} g_c(\gamma) G_c^{(1)}(\gamma) \quad \text{Eq. 12}$$

According to an embodiment, the weighting factors and the various thresholds employed in Eq. 1 to Eq. 12 are set from the OPS or the OPS in combination with an RNIS based on refarming policy messages which the base stations may provide to the RNIS and/or the OPS. The base stations may provide such refarming policy messages at regular intervals or in an event-driven manner. These messages may comprise information on the currently experienced load situation, an aggregated service profile, service profiles for specified groups of UE, service profiles per UE, hardware capabilities and inter-RAT capabilities of UE in the cell and cell configuration parameters like the currently used frequency resources etc. The OPS or the OPS in combination with an RNIS may adjust the weighting factors and thresholds in Eq. 1 to Eq. 12 according an averaged load situation and service profile in a cell or group of cells. It may be for instance beneficial to increase the weight of speech services during the rush hours when the request for speech services in the network increases, and additional frequency resources will be allocated to cells providing access to the RAT which is preferably used to handle speech services.

The figure of merit according Eq. 12 guides the resource scheduler in cell c to cooperative behaviour towards the set of neighbouring cells N(c).

The resource scheduler in each cell c is requested to optimize its figure of merit $G_c(c)$ according Eq. 12. It can do so by spending the channel resources in the cell preferably on links to UE with the best signal quality (signal to interference and noise ratio, SINR) on the air interface in combination with interference coordination between neighbouring cells and handover of UE to neighbouring cells. By optimizing $G_c(c)$ the resource schedulers will be guided such that data services and UE are arranged on the channel resources according the operators' policy and additional frequency bands or composite carriers in the cell will be omitted unless the performance on the currently used frequency bands or composite carriers is no longer sufficient. Therefore the usage of frequency bands or composite carriers will change over time during the gradual transition from a legacy RAT to an emerging RAT. The legacy RAT will predominantly occupy the frequency bands or composite carriers in the begin of this transition. But with ever increasing availability of UE supporting the emerging RAT the request for channel resources in the cells of the emerging RAT will rise and the cells of the emerging RAT will allocate more of the frequency bands or composite carriers while the demand in the cells of the legacy RAT will fade away.

In the course of the roll-out/phase-out the situation may for instance be such that frequency bands or composite carriers 1, 2 and 3 in an area are completely occupied by cells of the legacy RAT, frequency band or composite carrier 5 is already completely occupied by cells of the emerging RAT. But frequency band or composite carrier 4 needs to be shared in the area between cells providing access to the legacy RAT and cells providing access to the emerging RAT. This can be achieved by setting up rather small cells, very similar to home cells or femto cells, for both RAT preferably around identified hot spots, i.e. areas with high service demand for either RAT, and the cell sizes may be controlled through appropriately selected weighting factors $c_b(c, f_{CC}(b))$ according Eq. 11.

For support of handover a base station configures in its cell UE in connected mode to report inter-frequency and inter-RAT measurements of candidate cells. The base station may select the set of candidate cells based on information on neighbouring cells, such as the set of activated frequency bands or composite carriers, employed DL transmission powers of active frequency bands or composite carriers, load information of active frequency bands or composite carriers etc. The load information indicates a measure of free channel resources in UL and DL in the candidate cells. This does not necessarily mean that channel resources in the candidate cell are physically unused, but the employed modulation and coding schemes in the candidate cells for serving the data links to UE in connected mode may be more robust than actually needed for the currently valid channel conditions in the candidate cells and a less robust modulation and coding schemes may lead to basically equivalent data rates on the various links with less allocated channel resources. The indicated measure of free channel resources may be based for instance on an estimation of the modulation and coding schemes needed to fall below a certain block error rate threshold for the currently valid signal quality on the links and the channel resources needed to support these minimum required modulation and coding schemes. The indicated measure of free channel resources may further consider the current hardware load and the current load on the transport network layers in order to ensure that data of additional services after a potential handover can be processed and delivered from/to a candidate cell.

Based on measurement reports from its UE the base station of a cell may determine the path loss in DL from the base stations of the candidate cells to its UE and the UL path loss may be derived thereof through for instance some mapping tables or mapping functions. Using the indicated measure of free channel resources, the determined path loss information and the service request of its UE the base station may select the UE and associated candidate cells for initiating handover operations.

A cell c triggering a handover procedure of UE to cell d may, amongst others, indicate the potential increase of $G_c(d)$ according Eq. 12 in cell d after a successful handover into cell d. Cell c may select the UE for the triggered handover procedure and the target cell d such that $G_c(c)$ according Eq. 12 is maximized. The target cell d may allow the handover of the UE into cell d if the indicated potential increase of $G_c(d)$ and the availability of sufficient channel resources for serving the new UE in cell d is verified. After the handover of UE from cell c into cell d has been carried out cell c may advertise free channel resources to neighbouring cells which may in turn trigger new handover procedures into cell c. A minimum increase of $G_c(d)$ in the target cell d may be required in order to avoid handover of certain UE forth and back between two cells. Following this approach the arrangement of UE on the cells and frequency bands or composite carriers of the network will step by step reach an operating point close to a local optimum of the figures of merit according Eq. 12.

The base station of an overloaded cell which cannot find a neighbouring cell advertising free channel resources may request the activation of an additional band or composite carrier or the activation of a new cell by a neighbouring base station. The base station of the overloaded cell may select this neighbouring base station based on location information of UE served in the overloaded cell. The location information may be based on GPS measurement reports from UE or may be derived from measurement reports from UE on received DL signal strengths from base stations in neighbouring cells. The selected neighbouring base station may further depend on available UE capability information like the supported RAT.

When a base station has received such an activation request it may start to advertise itself or the new frequency band or composite carrier on a broadcast or beacon channel. It may further ignore operational costs $C_{OP}$ according Eq. 11 for a while and may start to ramp up gradually its transmission power $P_{TX}$ in the activated band or composite carrier until the new cell or frequency band or composite carrier is reported in measurement reports from UE in neighbouring cells. Once the activated cell or frequency band or composite carrier has been reported neighbouring base stations may initiate the above mentioned handover operations into the new cell or the new available frequency band or composite carrier. The bases station may further increase the transmission power $P_{TX}$ of the new cell, frequency band or composite carrier as long as the available channel resources are sufficient to serve additional UE and as long as the increased effective throughput in the cell, frequency band or composite carrier outweighs in the figure of merit according Eq. 12 the higher costs the higher transmission power $P_{TX}$ in Eq. 11 brings about. Conversely, a base station will reduce the transmission power $P_{TX}$ in a cell or frequency band or composite carrier when the total load in an area declines and the prescribed policy is to handle UE in the area preferably in other cells, frequency bands or composite carriers. In such a situation the base station will initiate handover of UE to preferred cells, frequency bands or composite carriers when free channel resources get available in the preferred cells, frequency bands or composite carriers. With less UE and thus diminishing effective throughput the figure of merit of a cell in Eq. 12 will be maximized by a lower transmission power $P_{TX}$ in the cell, frequency band or composite carrier. The cell, frequency band or composite carrier may finally be closed when the effective throughput does no longer bear operational costs $C_{OP}$ for maintaining the cell, frequency band or composite carrier.

The control of coverage areas inherent in the figure of merit according Eq. 12 can be combined with interference coordination between neighbouring cells in which the controlling base stations exchange power control messages based on UE measurement reports on neighbouring cells.

Obviously, the exchange of local refarming information can be treated by a generalized handover signalling scheme including signalling of frequency resources such as free channel resources, potential changes of a figure of merit, activation requests and power control messages between base stations. Therefore the exchange of local refarming information can be handled via the existing interfaces, like the S1 interface in LTE, for inter-RAT handover enhanced with new information elements, commands and messages.

Having regard to the subject matter disclosed herein, it should be mentioned that generally a network node or a network entity of a communication network may be configured to include both features of a network entity as disclosed herein and features of a network node as disclosed herein. An example of such a network entity which comprises features of a network node is provided by the network entity 302 in FIG. 3.

Further, although some embodiments refer to a "base station", "BS", "NB", "eNB", etc., it should be understood that each of these references is considered to implicitly disclose a respective reference to the general term "network access node". Also other terms which relate to specific standards or specific communication techniques are considered to implicitly disclose the respective general term with the desired functionality.

It should further be noted that a network entity or a network node as disclosed herein are not limited to dedicated entities as described in some embodiments. Rather, the herein disclosed subject matter may be implemented in various ways in various locations in the communication network while still providing the desired/described functionality.

According to embodiments of the invention, any component of the communication system, e.g. the network node or the network entity are provided in the form of respective computer program products which enable a processor to provide the functionality of the respective elements as disclosed herein. According to other embodiments, any component of the communication system, e.g. the network node or the network entity may be provided in hardware. According to other—mixed—embodiments, some components may be provided in software while other components are provided in hardware. Further, it should be noted that a separate component (e.g. a control subunit) may be provided for each of the functions disclosed herein. According to other embodiments, at least one component (e.g. a control subunit) is configured for providing two or more functions as disclosed herein.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

In order to recapitulate the above described embodiments of the present invention one can state:

A Network entity of a communication network and a network node are disclosed. The network entity comprises a control unit, wherein the control unit is configured for receiving network status information and providing a refarming control signal to a network node on the basis of the network status information. The refarming control signal is related to a reuse of a frequency resource of a first communication technology by a second communication technology, wherein the first communication technology and the second communication technology are different. For evaluation of frequency refarming, a concept of a figure of merit is disclosed which allows for an easy employment of a frequency refarming policy.

When some legacy communication technology (e.g. radio access technology, RAT) system is phased out and the new communication technology system rolls out, the load status per frequency resource and communication technology will change over time and area at least on the long run. The highest total throughput in the network is achieved if access rights to frequency resources are assigned sufficiently fast and with sufficient areal resolution. This cannot be accomplished by current OMA operations and things will get even more involved in future multi-band RAT systems where access rights to a plurality of composite carriers (CC) can be granted to a base station. Refarming of access rights in these systems that are handled by self-optimizing network procedures employing cognitive radio concepts may be advantageous.

The herein disclosed subject matter provides for a signalling procedure in place which can allow for flexible and fast removing or adding of access rights to frequency resources to network access nodes such as base stations in wireless communication techniques or cellular communication techniques. Such signalling procedures may be advantageous in self-optimizing network procedures, e.g. in future multi-band RAT such as paired, asymmetric, unpaired or scattered refarming of access rights between different RAT.

LIST OF REFERENCE SIGNS

In the following, reference signs which differ only in an appended character, e.g. 106a, 106b are abbreviated by separating only the appended character with commas, such as 106a,b.

- 100, 200, 300 communication system
- 102, 202, 302 network entity in the form of a operating policy server (OPS)
- 104, 204, 304 control unit of OPS
- 106a,b, 206a,b, 306a,b network status information
- 108a,b, 208a,b, 308a,b network node
- 110a,b, 210a,b, 310a,b refarming control signal
- 112a,b cell
- 214a,b, 314a,b control unit of network node
- 216a,b, 316a,b refarming control signal between network nodes
- 318 network entity in the form of a refarming neighborhood information server (RNIS)
- 320 control unit of RNIS
- 322 secondary status information
- 324 primary refarming control signal

401, 501 cell/network access node (node-B, NB), which shall release a frequency resource
402, 502 radio network controller (RNC)/serving GRPS support node (SGSN)
403, 503 operating policy server (OPS)
404, 504 mobility management entity (MME)
405, 505 cell/network access node (enhanced node-B, eNB) to which a frequency resource shall be added
S1a,b: Monitor the load statistics of frequency/RAT per cell.
S2: Determine frequency refarming when the statistics satisfies a certain threshold.
S3a,b: Trigger frequency refarming
S4: Redirect UEs in the emptying frequency resource/RAT to target cells
S5: Release frequency resource
S6, S6a,b,c: Release successful report
S7: Instruct cell/eNB to add frequency
S8: Broadcast SIB of dynamic frequency
S1a',b': Monitor the load statistics of frequency/RAT per cell
S2': Determine frequency refarming
S3a': Trigger frequency refarming
S3b': Trigger frequency refarming
S4': Redirect UEs in the emptying frequency resource/RAT to target cells
S5': Release frequency resource
S6', 6a',b',c': Relase successful report
S7': Instruct cell/eNB to add frequency
S8': New cell is available on the refarming frequency

The invention claimed is:

1. A method comprising:
receiving network status information comprising a service quality measure for at least one user equipment in a cell of a communication network, wherein the cell is associated with a frequency resource and a communication technology;
determining a refarming control signal for a network node comprising a weighting of the service quality measure, wherein the refarming control signal is related to a reuse of the frequency resource by a different communication technology; and wherein the weighting comprises on one or more of:
the communication technology associated with the cell,
the frequency resource associated with the cell,
capability information of the at least one user equipment, and
service profile of the at least one user equipment.

2. The method according to claim 1,
the network status information further comprising a second service quality measure for the at least one user equipment in a second cell of the communication network, the second cell being associated with a second frequency resource and a communication technology, and the determining of the refarming control signal further comprising a weighting of the second service quality measure; and wherein the weighting of the second service quality measure comprises on one or more of:
the communication technology associated with the second cell,
the frequency resource associated with the second cell,
capability information of the at least one user equipment,
service profile of the at least one user equipment.

3. The method according to claim 2,
the determining of the refarming control signal further comprising determining a figure of merit; and the refarming control signal comprising a signal for initiating a handover of the at least one user equipment between the cell and the second cell such that the figure of merit is increased.

4. The method according to claim 3, further comprising:
sending or receiving of handover signaling comprising one or more of:
information indicative of a potential change of the figure of merit through the handover, and
information indicating reuse of a frequency resource as cause for the handover.

5. The method according to claim 1,
said refarming control signal including an operating policy signal defining at least one decision parameter on the basis of which the network node initiates release of said frequency resource of said first communication technology.

6. The method according to claim 1,
the network node being a network access node providing to user equipments access to said communication network;
the refarming control signal comprising an operation state setting signal for activating or deactivating an access providing capability of said network access node.

7. A computer program comprising a non-transitory computer-readable storage medium bearing computer program code embodied therein for use with a computer, the computer program code comprising code for performing or controlling the method of claim 1.

8. An apparatus comprising:
at least one processor and at least one memory including computer program code, wherein the at least one memory and the computer code are configured, with the at least one processor, to cause the apparatus to at least perform the following:
receive network status information comprising a service quality measure for at least one user equipment in a cell of a communication network, wherein the cell is associated with a frequency resource and a communication technology;
determine a refarming control signal for a network node comprising a weighting of the service quality measure, wherein the rearming control signal is related to a reuse of the frequency resource by a different communication technology; and wherein the weighting comprises one or more of:
the communication technology associated with the cell,
the frequency resource associated with the cell,
capability information of the at least one user equipment, and
service profile of the at least one user equipment.

9. The apparatus of claim 8, the network status information further comprising a second service quality measure for the at least one user equipment in a second cell of the communication network, the second cell being associated with a second frequency resource and a communication technology, and the determining of the refarming control signal further comprising a weighting of the second service quality measure; and wherein the weighting of the second service quality measure comprises on one or more of:
the communication technology associated with the second cell,
the frequency resource associated with the second cell,
capability information of the at least one user equipment,
service profile of the at least one user equipment.

10. The apparatus of claim 9, wherein
the determining of the refarming control signal further comprises determining a figure of merit; and the refarming control signal comprises a signal for initiating a handover of the at least one user equipment between the cell and the second cell such that the figure of merit is increased.

11. The apparatus of claim 10, wherein the at least one memory and the computer code are further configured, with the at least one processor, to cause the apparatus to at least perform the following: send or receive handover signaling comprising one or more of:
  information indicative of a potential change of the figure of merit through the handover, and
  information indicating reuse of a frequency resource as cause for the handover.

12. The apparatus of claim 8, wherein said refarming control signal includes an operating policy signal defining at least one decision parameter on the basis of which the network node initiates release of said frequency resource of said first communication technology.

13. The apparatus of claim 8, wherein
  the network node is a network access node providing to user equipments access to said communication network; and
  the refarming control signal comprises an operation state setting signal for activating or deactivating an access providing capability of said network access node.

* * * * *

UNITED STATES PATENT AND TRADEMARK OFFICE
CERTIFICATE OF CORRECTION

PATENT NO. : 9,301,301 B2
APPLICATION NO. : 13/643599
DATED : March 29, 2016
INVENTOR(S) : Ottmar Aumann and Jian Feng Qiang It is certified that error appears in the above-identified patent and that said Letters Patent is hereby corrected as shown below:

In the claims,

In Claim 8:
Column 38, line 42, "rearming" should be deleted and --refarming-- should be inserted.

Signed and Sealed this
Twenty-eighth Day of June, 2016

Michelle K. Lee
*Director of the United States Patent and Trademark Office*